(12) United States Patent
Tateishi et al.

(10) Patent No.: US 7,263,040 B2
(45) Date of Patent: Aug. 28, 2007

(54) READ/WRITE POSITION CONTROLLER FOR OPTICAL PICKUP

(75) Inventors: Kiyoshi Tateishi, Tsurugashima (JP); Kazuo Takahashi, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 579 days.

(21) Appl. No.: 10/845,445

(22) Filed: May 14, 2004

(65) Prior Publication Data
US 2004/0228234 A1 Nov. 18, 2004

(30) Foreign Application Priority Data
May 15, 2003 (JP) ............................. 2003-137273
Oct. 31, 2003 (JP) ............................. 2003-373527

(51) Int. Cl.
*G11B 7/00* (2006.01)
(52) U.S. Cl. ............................. 369/44.29; 369/44.32; 369/44.36
(58) Field of Classification Search .............. 369/44.36
See application file for complete search history.

(56) References Cited
U.S. PATENT DOCUMENTS
6,738,327 B2 * 5/2004 Tateishi et al. .......... 369/47.36
6,819,636 B1 * 11/2004 Soma et al. ............. 369/44.29

FOREIGN PATENT DOCUMENTS

| JP | 10-106012 A | 4/1998 |
|---|---|---|
| JP | 2001-307346 A | 11/2001 |
| JP | 2002-008253 A | 1/2002 |

* cited by examiner

*Primary Examiner*—Andrea Wellington
*Assistant Examiner*—Jorge L. Ortiz-Criado
(74) *Attorney, Agent, or Firm*—Sughrue Mion, PLLC

(57) ABSTRACT

A controller includes a servo-controller for performing nonlinear and linear control of the read/write position according to an error signal to drive an actuator for driving the pickup; a switch for switching the servo-controller from open-mode to closed-mode according to the error signal; and an adjuster for adjusting the gains of the nonlinear and linear control so that the nonlinear control component is larger than the linear control component at the time of switching and the linear control component is larger than the nonlinear control component after the elapse of a predetermined time from the time of switching.

17 Claims, 22 Drawing Sheets

READ/WRITE POSITION CONTROLLER FOR OPTICAL PICKUP

BACKGROUND OF THE INVENTION

1. Field of the Invention

The present invention relates to a read/write position controlling apparatus of an optical pickup which performs read/write operation from/to a recording medium.

2. Description of the Related Art

Research and development of high-density large-capacity information recording media is now actively pursued with the recent development of an information and communications technology. Such recoding media include optical recording media and magnetic recording media. For example, known optical recording media include optical discs such as a compact disc (CD) and a digital versatile disc (DVD). Also it is known to provide a multilayer optical disc capable of increasing the recording capacity of each recoding surface by providing a plurality of recording layers on the same recording surface (side) for larger capacity optical discs.

Furthermore, research and development of an optical disc that uses a blue violet laser as a light source, for example, Blu-ray Disc, is energetically pushed forward as a next-generation large-capacity optical disc.

It is required to increase the performance of read/write device with increasing density of the recording media. Particularly, it is important to achieve high performance of read/write position controllers including servo control for controlling the read/write position on the recording media.

A position controller using nonlinear control (sliding-mode control) has been proposed. For example, refer to Japanese Patent Application Kokai H10-106012. The controller is used for controlling a recording-medium (recording-paper) feeding system of a printer and so on, using sliding-mode control in order to prevent remaining vibration immediately before the stop of feeding of the recording medium to a target position. Upon stopping the feeding of the recording medium, the target position control is also stopped.

The nonlinear control is disadvantageous in that control input tends to produce chattering (high-frequency vibration) and power consumption is large.

As set forth hereinabove, it is important to increase the performance of the controller used for recording media such as recording discs capable of writing information and reading the written or recorded information with the development of high-density recording. For example, reader/writers that use optical recording discs need to move and focus a light beam used for writing and reading to a target write or read position and thereafter to perform writing or reading operation while performing tracking control and focusing control. Thus, it is required to enhance the speed, accuracy, and stability of the pickup write/read position controller, including servo control such as tracking control and focusing control.

As described above, it is necessary for the high-recording-density recording media to move light beams to the vicinity of a target position (perform a tracking jump or a focus jump) with the servo is open and then to perform a servo pulling-in operation quickly and stably. Furthermore, the high-speed and stable servo pulling-in is necessary also after an actuator is driven for preventing unstable servo control due to the defects of the recording media.

For example, optical discs generally have various defects, such as scratches, dirt, and finger prints, formed when the discs are manufactured or used, which cause impediments to stable servo control. The existence of the defects causes incorrect indications of a tracking error and a focus error, disturbing the servo control when the actuator is driven in accordance with the indications.

Conventional servo control has employed linear control in which an error signal is subjected to linear phase compensation and then the actuator is driven. In order to prevent adverse effects on the servo control due to the defects of the disc, a method has been employed in which when a defect is detected, servo failure due to a false error signal (i.e., not indicating a correct amount of deviation from a target value) is reduced by using an error value ("former value" hold) before the detection of the defect or the low-frequency component (or, integral signal) of the error signal as a servo control signal. For example, refer to Japanese Patent Application Kokai No. 2002-008253.

Even such defect detection may cause time delay (detection delay time or, simply, delay time) from the occurrence of a defect until the detection of the defect. During the delay time, servo control is performed on the basis of the false error signal affected by the defect, causing the disturbance of servo control. For example, refer to Japanese Patent Application Kokai No. 2002-008253. Also the operation of changing the characteristics of a liner controller before and after the defect detection has been performed. For example, refer to Japanese Patent Application Kokai No. 2001-307346.

The above-described related-art servo control using the hold-value is, however, disadvantageous in that the deviation amount indicated by the hold-value and an actual deviation amount are greatly different from each other during the occurrence of a defect, causing a transient phenomenon after completion of the defect to delay the convergence of the error signal to a normal value, thus making the servo control unstable. Also, there is a limitation to improvement of the convergence by changing the characteristics of the linear controller after completion of the defect, which is insufficient. Furthermore, for example, when a defect such as a finger print appears repeatedly, the interval between the defects is extremely short, thus making it difficult to pull-in the servo stably within the valid section therebetween. For example, when a defect appears repeatedly, with only normal linear control, the servo control is disturbed by the following defect before the pulling-in operation is surely performed after completion of one defect. The repetition of the disturbance causes deviation to be gradually accumulated to be increased, thus making it difficult to perform stable servo control.

SUMMARY OF THE INVENTION

The present invention has been made in consideration of the above problems. Accordingly, it is an object of the invention to provide a high-performance read/write position controller having a high-stability and high-speed control capability.

According to the present invention, there is provided a read/write position controller of a pickup that reads from and/or writes to a recording medium while relatively moving a read/write position of the pickup and a read/write target position of the recording medium, which comprises an error signal generator for generating a position error signal indicating an error between the read/write position of the pickup and the read/write target position of the recording medium; an actuator for driving the pickup to change the read/write position of the pickup; a servo controller for performing nonlinear control and linear control of the read/write position of the pickup according to the position error signal to drive the actuator; a switching section for switching the servo controller from open mode to closed mode according to the position error signal; and an adjusting section for adjusting the gains of the nonlinear control and the linear control so that the nonlinear control component is larger than the linear control component at the time of switching of the servo controller from open mode to closed mode and the linear control component is larger than the nonlinear control component after the elapse of a predetermined time from the time of switching.

According to another aspect of the present invention, there is provided a read/write position controller of a pickup that reads from and writes to an optical recording medium including a plurality of recording layers while relatively moving a read/write position of the pickup and a read/write target position of the optical recording medium, which comprises an error signal generator for generating a position error signal indicating an error between the read/write position of the pickup and the read/write target position of the optical recording medium; an actuator for driving the pickup to change the read/write position of the pickup; a servo controller for performing nonlinear control and linear control of the read/write position of the pickup according to the position error signal to drive the actuator; a receiving section for receiving a jump instruction signal instructing to jump the read/write position from one recording layer of the optical recording medium to another recording layer; a read/write position jump section for shifting the servo controller to open mode and moving the read/write position to the other recording layer according to the jump instruction signal; a switching section for switching the servo controller to closed mode for the other recording layer according to the position error signal; and an adjusting section for adjusting the gains of the nonlinear control and the linear control so that the nonlinear control component is larger than the linear control component at the time of switching of the servo controller to closed mode for the other recording layer and the linear control component is larger than the nonlinear control component after the elapse of a predetermined time from the time of switching.

According to another aspect of the present invention, there is provided a read/write position controller of a pickup that reads from and writes to a recording medium while relatively moving a read/write position of the pickup and a read/write target position of the recording medium, which comprises an error signal generator for generating a position error signal indicating an error between the read/write position of the pickup and the read/write target position of the recording medium; an actuator for driving the pickup to change the read/write position of the pickup; a servo controller for performing nonlinear control and linear control of the read/write position of the pickup according to the position error signal to drive the actuator; a receiving section for receiving a jump instruction signal instructing to jump the read/write position from one recording track of the recording medium to another recording track; a read/write position jump section for shifting the servo controller to open mode and moving the read/write position to the other recording track according to the jump instruction signal; a switching section for switching the servo controller to closed mode for the other recording track according to the position error signal; and an adjusting section for adjusting the gains of the nonlinear control and the linear control so that the nonlinear control component is larger than the linear control component at the time of switching of the servo controller to closed mode for the other recording track and the linear control component is larger than the nonlinear control component after the elapse of a predetermined time from the time of switching.

According to another aspect of the present invention, there is provided a controller for performing servo control of a read/write position of a pickup on the basis of the amount of deviation from a read/write target position of the pickup, which comprises an error signal generator for generating an error signal indicating the amount of deviation from the target position; an actuator for driving the pickup to change the read/write position of the pickup; a defect detecting section for detecting the occurrence and disappearance of a defect on the recording medium; a servo controller for performing nonlinear control and linear control of the read/write position of the pickup according to the error signal to drive the actuator; and an adjusting section for adjusting the gains of the nonlinear control and the linear control so that the nonlinear control component is larger than the linear control component during a predetermined period after the time when the defect detecting section detects the disappearance of the defect.

According to another aspect of the present invention, there is provided a method for performing servo control of a read/write position of a pickup on the basis of the amount of deviation from a read/write target position of the pickup while moving the pickup read/write position, which comprises an error-signal generating step of generating an error signal indicating the amount of deviation from the target position; a driving step of driving the pickup to change the read/write position of the pickup; a defect detecting step of detecting the occurrence and disappearance of a defect on the recording medium; a servo controlling step of performing nonlinear control and linear control of the read/write position of the pickup according to the error signal to drive the actuator; and a gain adjusting step of adjusting the gains of the nonlinear control and the linear control so that the nonlinear control component is larger than the linear control component during a predetermined period after the time when the disappearance of a defect is detected in the defect detecting step.

DETAILED DESCRIPTION OF THE INVENTION

Figure 1:
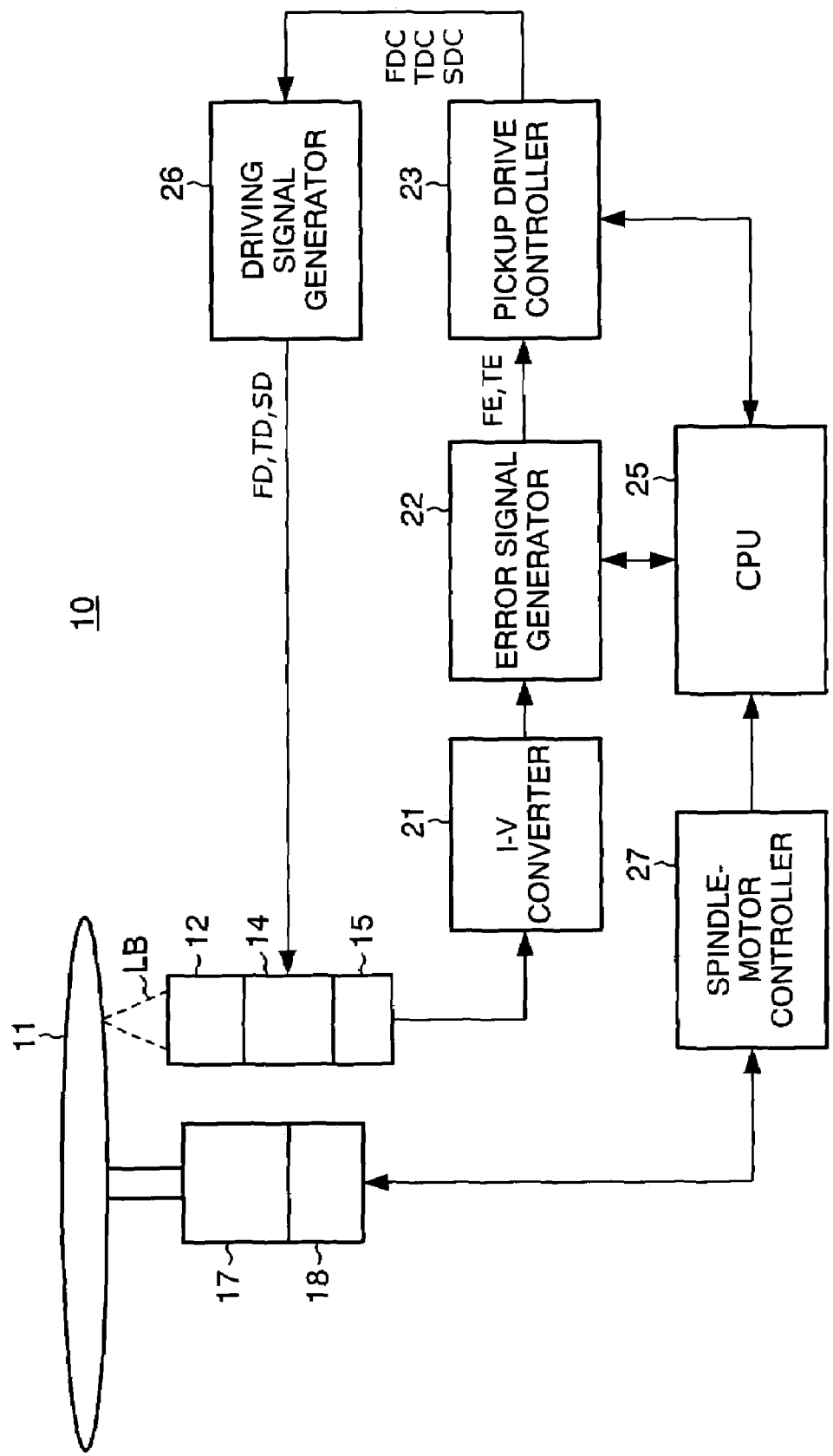
FIG. 1 is a block diagram of the configuration of a read/write position controller according to an embodiment of the present invention.

Embodiments of the present invention will be described hereinafter with reference to the drawings, wherein equivalent components are given the same reference numerals.

FIRST EMBODIMENT

FIG. 1 is a block diagram of the configuration of a read/write position controller 10 according to an embodiment of the present invention. The read/write position controller 10 controls the focusing position and the tracking position of a light beam used for writing to or reading from an optical disc 11 (that is, controls a read/write position). The configuration of the read/write position controller 10 will be described in detail hereinafter.

The optical disc 11 is rotated by a spindle motor 17. The spindle motor 17 is controlled by a spindle-motor controller 27. The spindle-motor controller 27 is controlled by a later-described central controller (CPU) 25. The rotation signals representing the rotation speed and the rotation angle of the spindle motor 17 are detected by a rotation detector 18. The detected signals are supplied to a spindle-motor controller 27 and the central controller (CPU) 25.

A pickup optical system 12 includes a laser light source that emits a light beam (LB) and an objective lens. The components of the pickup optical system 12 are not shown in the drawing. The light beam from the laser light source is focused on the recording layer of the optical disc 11 through the objective lens. The light reflected by the optical disc 11 is collected by the objective lens and received by a photodetector 15.

The pickup optical system 12 is driven by a pickup driver 14. As will be described later, the pickup driver 14 includes a focus actuator 14A, a tracking actuator 14B, and a slider motor 14C, which are not shown in FIG. 1. The pickup driver 14 operates under the control of the driving signal generated by a driving signal generator 26. The slider motor 14C is operated according to the driving signal so as to slide the pickup optical system 12 to read/write tracking position.

The photodetector 15 includes, for example, a light-receiving element having a plurality of light-receiving sections, such as a four-divided light-receiving element. The four-divided light-receiving element has four light-receiving sections divided into four in the direction along the recording track (tangential direction) of the optical disc 11 and the direction perpendicular to the recording track (radial direction). The light reflected from the optical disc 11 is received by the four light-receiving sections, which is individually converted to an electric signal and outputted.

The signals obtained by photoelectric conversion are converted to voltage signals by a current-voltage (I-V) converter 21. The converted signals are supplied to a focus/tracking error signal generator (hereinafter, simply referred to as an error signal generator) 22 as detection signals. The error signal generator 22 generates a focus error signal FE and a tracking error signal TE. In other words, the focus error signal FE and the tracking error signal TE indicate errors between a read/write target position on an optical recording medium and a read/write position of an optical pickup.

The focus error signal FE is generated by, for example, an astigmatic method. In other words, the focus error signal FE is produced as deviation from the focal point of the objective lens, caused by the astigmatism in the optical system. The tracking error signal TE is produced by, for example, a differential phase detection (DPD) method. In other words, the tracking error signal TE is produced by the phase difference of the light-receiving signals by light-receiving sections in diagonal positions of the four-divided light-receiving element.

The focus error signal FE and the tracking error signal TE generated by the error signal generator 22 are supplied to a pickup drive controller 23. The pickup drive controller 23 performs the focusing control, the tracking control, and the slider control under the control of the central controller (hereinafter, referred to as a CPU) 25 for controlling the entire apparatus. The pickup drive controller 23 generates a focusing control signal FDC, a tracking control signal TDC, and a slider control signal SDC in accordance with the focus error signal FE, the tracking error signal TE, and a track-position control signal from the CPU 25 and outputs them to the driving signal generator 26. As described above, the driving signal generator 26 generates a focusing driving signal FD, a tracking driving signal TD, and a slider driving signal SD and sends them to the pickup driver 14.

The configuration of a focus servo controller and the pull-in operation of the first embodiment of the present invention will be described in detail with reference to the drawings.

Figure 2:
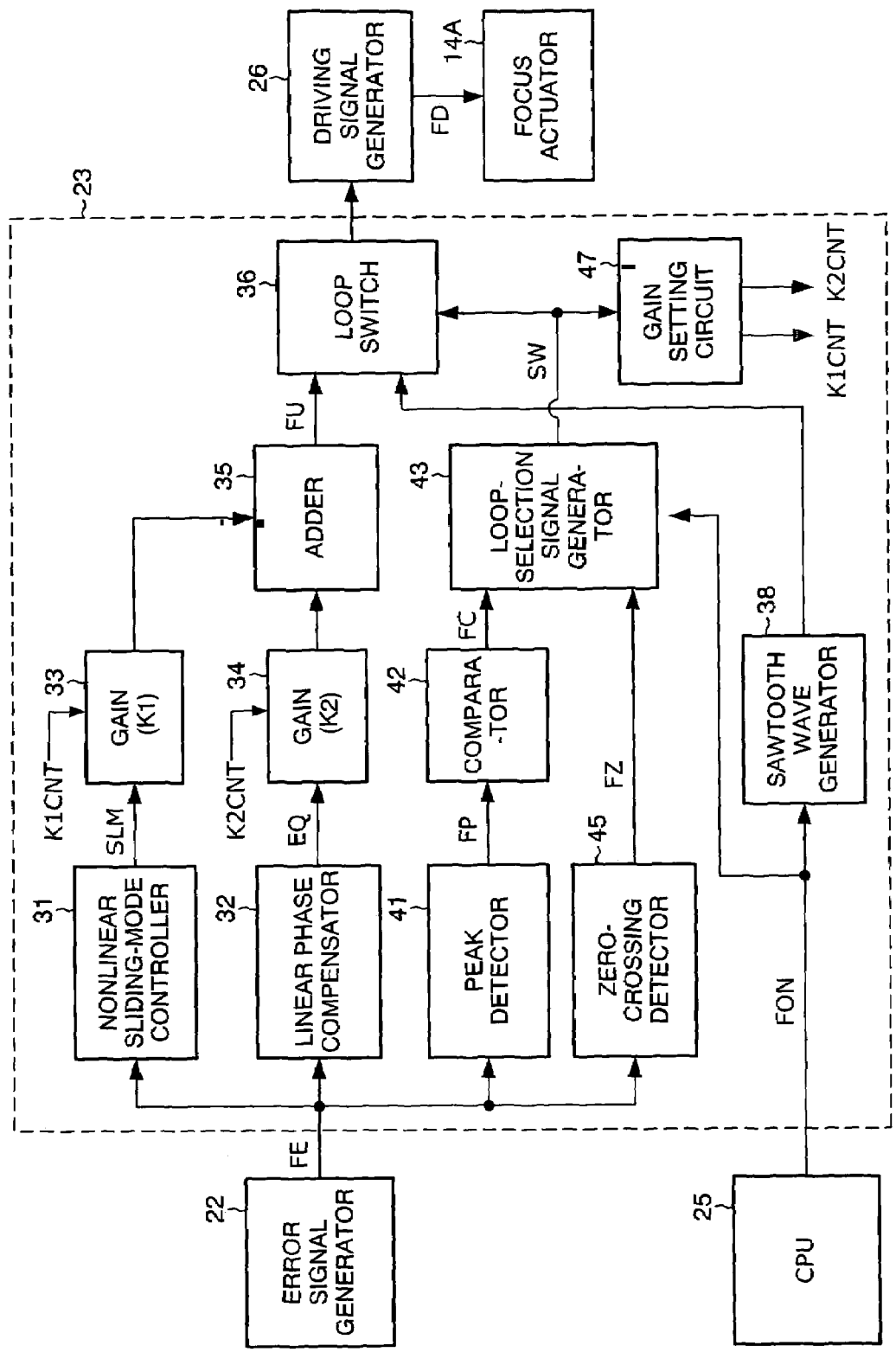
FIG. 2 is a detailed block diagram of a pickup drive controller of the read/write position controller.

FIG. 2 is a detailed block diagram of the pickup drive controller 23 of the read/write position controller 10. The read/write position controller 10 is provided with a first control system (i.e., nonlinear control system) and a second control system (i.e., linear control system) in the embodiment, as shown in FIG. 2.

More specifically, the focus error signal FE, from the error signal generator 22 is supplied to a nonlinear sliding-mode controller (hereinafter, simply referred to as a sliding-mode controller) 31, in which a nonlinear control signal SLM is generated. The nonlinear control signal SLM is supplied to a first amplifier 33 (gain K1) and amplified therein.

The focus error signal FE from the error signal generator 22 is phase compensated by a linear phase compensator 32. A signal EQ after the phase compensation is supplied to a second amplifier 34 (gain K2) and amplified therein.

The nonlinear and the linear control signals amplified by the first amplifier 33 and the second amplifier 34, respectively, are added to each other in an adder 35. The signals obtained by addition (addition signals) are supplied to a loop switch 36 as control input FU. The gain K1 of the first amplifier 33 and the gain K2 of the second amplifier 34 are controlled by gain control signals K1CNT and K2CNT from a later-described gain setting circuit, respectively.

The loop switch 36 is provided with a sawtooth wave signal from a sawtooth wave generator 38. The sawtooth wave generator 38 generates the sawtooth wave signal according to a focus-servo start signal FON from the CPU 25.

The focus error signal FE from the error signal generator 22 is supplied to a peak detector 41, in which the peak thereof (for example, negative peak) is detected. The peak detection signal FP is supplied to a comparator 42 to be compared with a predetermined reference value or threshold value. A signal FC indicating the comparison result is supplied from the comparator 42 to a loop-selection signal generator 43. The focus error signal FE from the error signal generator 22 is subjected to zero-cross detection by a zero crossing detector 45. Its detection signal FZ is supplied to the loop-selection signal generator 43. The loop-selection signal generator 43 generates a loop selection signal SW based on the signals FC, FZ, and FON and sends the loop selection signal to a loop switch 36 and a gain setting circuit 47.

The loop switch 36 switches the control input FU from the adder 35 and the sawtooth wave signal from the sawtooth wave generator 38 according to the loop selection signal SW to be supplied to the driving signal generator 26. The driving signal generator 26 converts the signal supplied from the loop switch 36 to the focusing driving signal FD to be supplied to the focus actuator 14A in the pickup driver 14.

Figure 3:
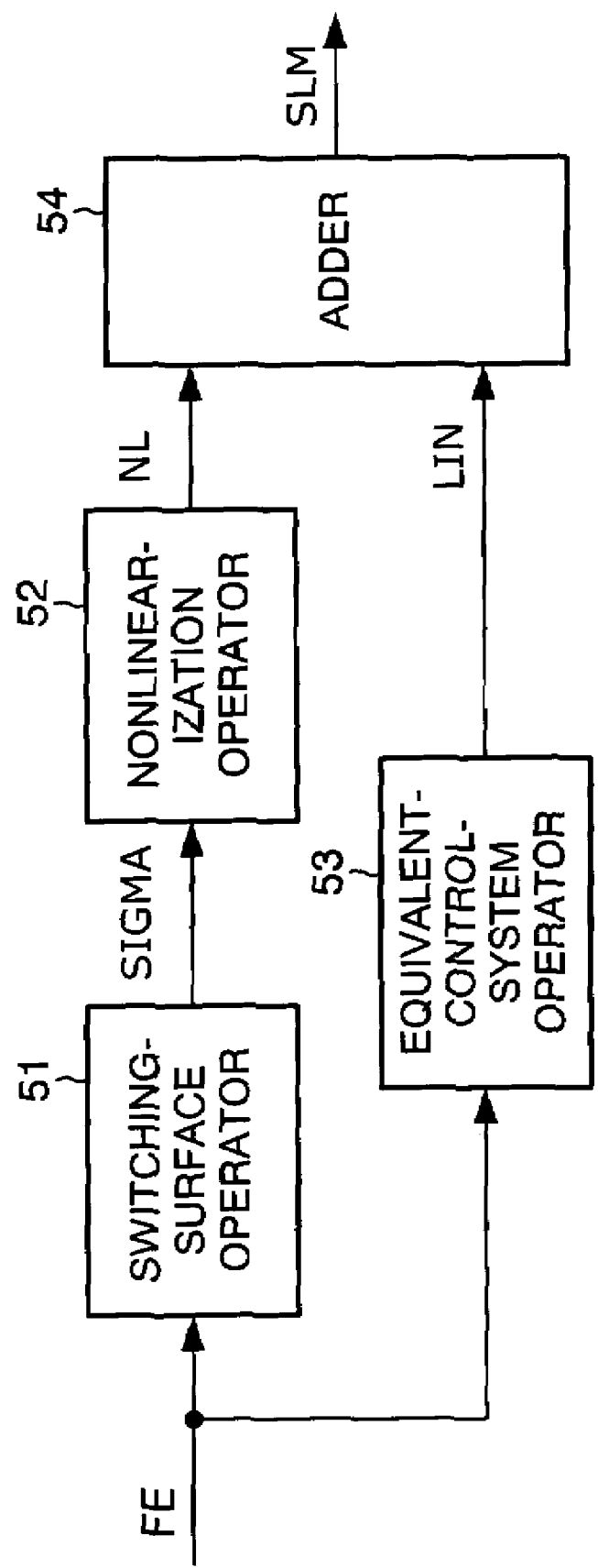
FIG. 3 is a block diagram of one example of a sliding-mode controller in the embodiment of the present invention.
Figure 4:
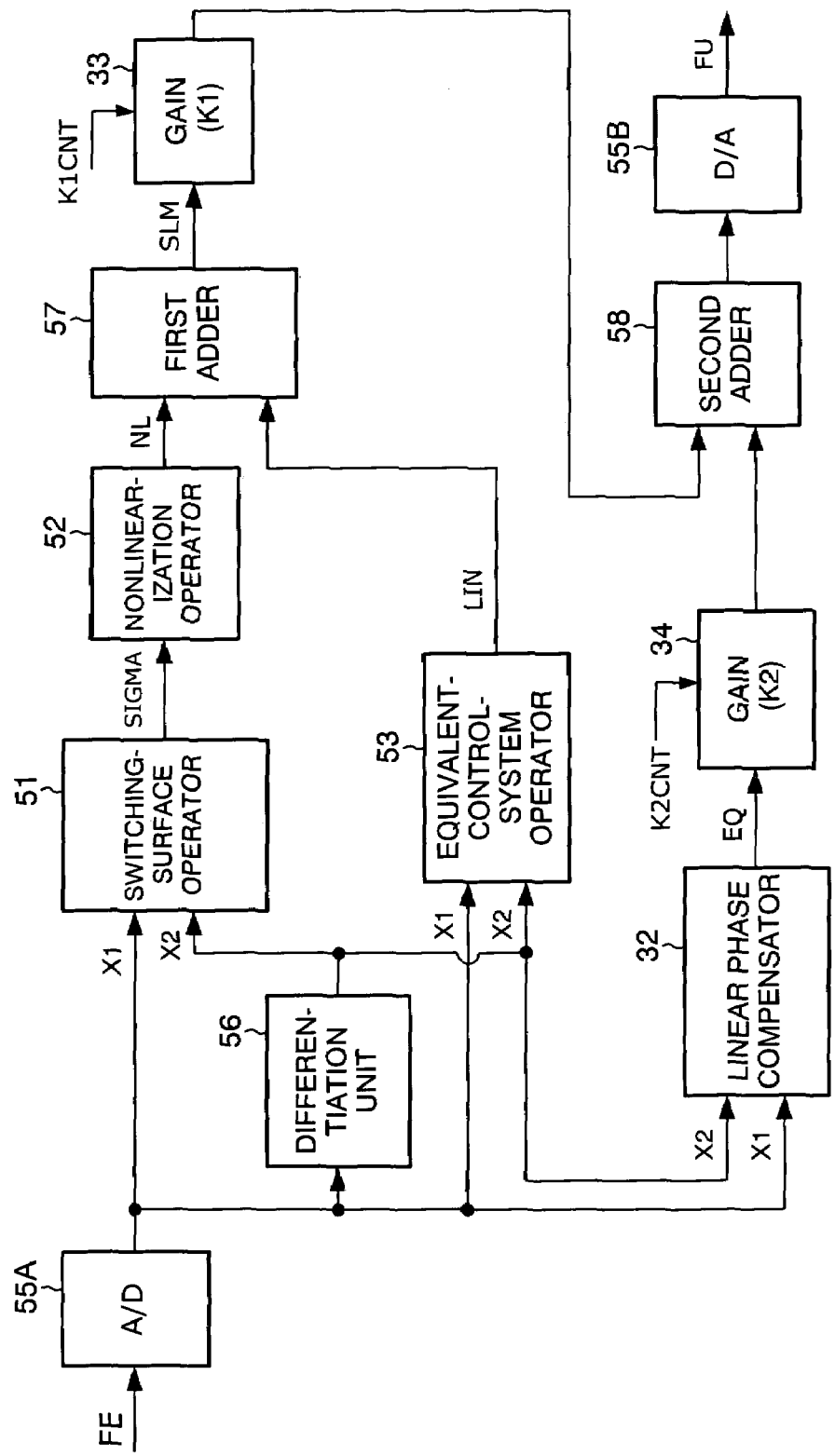
FIG. 4 is a specific block diagram of a sliding-mode control system and a linear control system.

Referring now to FIGS. 3 and 4, an example of the sliding-mode controller of the embodiment will be described.

As shown in FIG. 3, the focus error signal FE is supplied to both of a switching-surface operator 51 and an equivalent-control-system operator 53. The switching-surface operator 51 performs a switching-surface operation to output a switching surface SIGMA. The nonlinearization operator 52 nonlinearizes the switching surface SIGMA to output a nonlinear output NL. The equivalent-control-system operator 53 performs the operation of an equivalent control system to output a linear output LIN. The nonlinear output NL and the linear output LIN are added to each other by an adder 54, thus providing the output SLM of the sliding-mode controller.

Referring to FIG. 4, the sliding-mode controller and the linear phase compensator will be described in detail. The focus error signal FE is quantized by an analog-digital (A/D) converter 55A to provide a focus position error $X1$ as a digital value. The position error is differentiated into a velocity error $X2$ by a differentiation unit 56. The switching-surface operator 51 performs the following matrix operation or vector operation to obtain the switching surface SIGMA:

SIGMA=$S \cdot X$, where $S=[S1, S2]$ and $X={}^t[X1, X2]$.

The nonlinearization operator 52 performs the following operation to obtain the nonlinear output NL:

$NL=K \cdot \text{sgn (SIGMA)}$.

The equivalent-control-system operator 53 performs the following operation to obtain the linear output LIN:

$LIN=L \cdot X$, where $L=[L1, L2]$.

The first adder 57 performs the following operation to obtain the sliding-mode control output SLM:

$SLM=NL+LIN$.

The linear phase compensator 32 performs the following operation to obtain the linear-phase compensation output EQ:

$EQ=Kp \cdot X1+Kd \cdot X2+Ki \cdot X1/(1-z^{-1})$.

The analog quantity FU is given by the equation using the sliding-mode control output SLM and the linear-phase compensation output EQ.

$FU=K1 \cdot SLM+K2 \cdot EQ$

Specifically, the outputs SLM and EQ are amplified by the amplifiers 33 and 34 with the gains K1 and K2, respectively, and added to each other by a second adder 58. The operation result of the second adder 58 is converted to an analog value by a digital-analog (D/A) converter 55B; thus the analog quantity FU is given.

Figure 5:
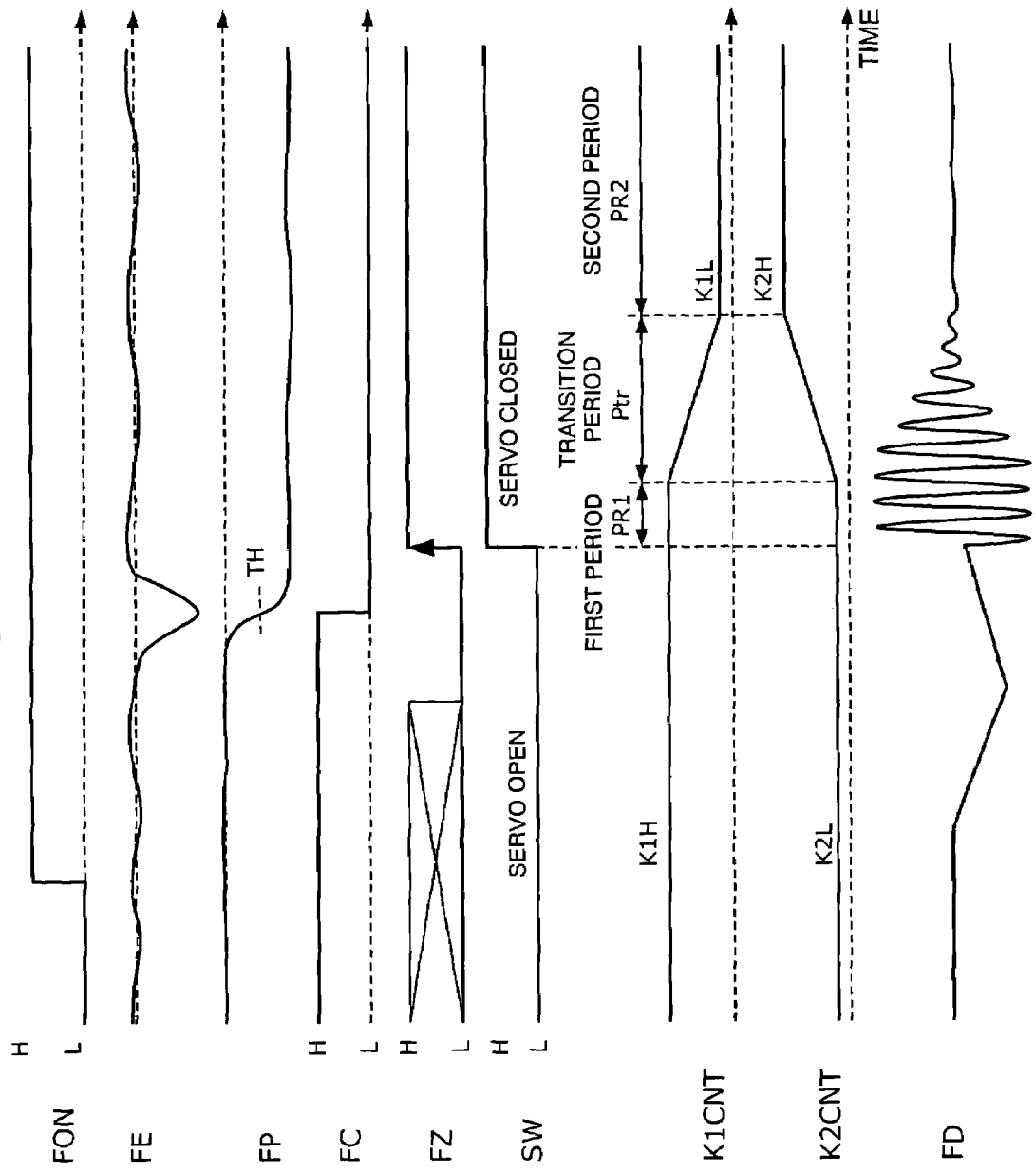
FIG. 5 is a timing chart for the respective signals in the sliding-mode control system and the linear control system of FIG. 4.

Referring now to FIG. 5, the pull-in operation of the focus servo control will be described in detail with reference to the timing chart of the above-described signals.

When a focus-servo start instruction is issued from the CPU 25, the focus-servo start signal FON is changed from a low level (hereinafter, referred to as L-level) to a high level (hereinafter, referred to as H-level). When the focus-servo start signal FON reaches H-level, the loop-selection signal generator 43 sets the loop selection signal SW at L-level and switches the input of the loop switch 36 to the sawtooth wave generator 38 to open the servo loop.

When the loop selection signal SW is at L-level, the gain setting circuit 47 sets the gain K1 of the first amplifier 33 in the nonlinear control system (on the side of the nonlinear sliding-mode controller 31) to a high gain K1H and sets the gain K2 of the second amplifier 34 in the linear control system (on the side of the linear phase compensator 32) to a low gain K2L, as initial gains.

The sawtooth wave generator 38 then generates a voltage that drops the focusing driving signal FD in order to temporarily move the objective lens away from the optical disc 11. The sawtooth wave generator 38 then generates a voltage that raises the focusing driving signal FD in order to move the objective lens close to the optical disc 11. When the distance between the objective lens and the optical disc 11 comes close to the focal point, an S-shaped focus error signal FE starts to generate. The peak detector 41 detects a negative peak of the focus error signal FE and generates the detection signal FP. The detection signal FP of the peak detector 41 is compared to a predetermined reference value TH by the comparator 42, wherein when the detection signal FP reaches the predetermined reference value TH (in the embodiment, when the detection signal FP becomes lower than the reference value TH), the output FC of the comparator 42 changes from H-level to L-level.

When the zero-cross of the focus error signal FE is detected by the zero-crossing detector 45, the zero-cross detection signal FZ of the zero-crossing detector 45 changes from L-level to H-level. When the output FC of the comparator 42 is at L-level and the rising edge of the zero-cross detection signal FZ is detected, the loop-selection signal generator 43 changes the loop selection signal SW from L-level to H-level. The loop switch 36 switches the servo loop from an open mode to a closed mode in response to the change of the loop selection signal SW. In other words, the loop-selection signal generator 43 and the loop switch 36 serve as switching sections that determine the timing of switching to a servo-loop closed mode depending on the focus error signal FE and switches the servo loop from an open mode (open state) to a closed mode (closed state).

In response to the change of the loop selection signal SW from L-level to H-level, the gain setting circuit 47 generates a gain control signal K1CNT such that the gain K1 of the first amplifier 33 in the nonlinear control system gradually decreases at a predetermined timing from the initially set gain K1H (high gain) to a low gain K1L after the elapse of a predetermined time and also generates a gain control signal K2CNT such that the gain K2 of the second amplifier 34 in the linear control system gradually increases from the initially set gain K2L (low gain) to become a high gain K2H after the elapse of a predetermined time.

More specifically, the servo is controlled so that the nonlinear control (sliding-mode control) is dominant at the time of switching to closed mode. In other words, control is performed so that the nonlinear control component of the servo-control is larger than that of the linear control in the initial state of servo pull-in, that is, during a predetermined time (first predetermined time) after the switching to closed mode (hereinafter, this period is referred to as a "first period (PR1)") or alternatively the ratio of the nonlinear control component to the linear control component is larger than a predetermined value. After the elapse of the first period, the gains are adjusted so the linear control component is increased and the nonlinear control component is decreased so that the linear control component is larger than the nonlinear control component after the elapse of the first period (hereinafter, this period is referred to as a "transition period (Ptr)"). Furthermore, the gains are adjusted so that the linear control component and the nonlinear control component are constant after the linear control component and the nonlinear control component have reached predetermined values (after the respective gains of the linear control and the nonlinear control have reached K2H and K1L, respectively), or the ratio of the linear control component to the nonlinear control component has reached a predetermined value (hereinafter, referred to as a "second period (PR2)").

It is also possible to control the servo so that the nonlinear control is predominant, that is, the nonlinear control component is sufficiently larger than the linear control component during the first period. Alternatively, the linear control component may be zero or negligible. Similarly, it is also possible to control the servo so that the linear control component is predominant, that is, the linear control component is sufficiently larger than the nonlinear control component during the second period which is in a steady state. Alternatively, the nonlinear control component may be zero or negligible. In this description, that the nonlinear control component (or the linear control component) is dominant includes that the nonlinear control component (or the linear control component) is absolutely predominant or sufficiently large.

Figure 6:
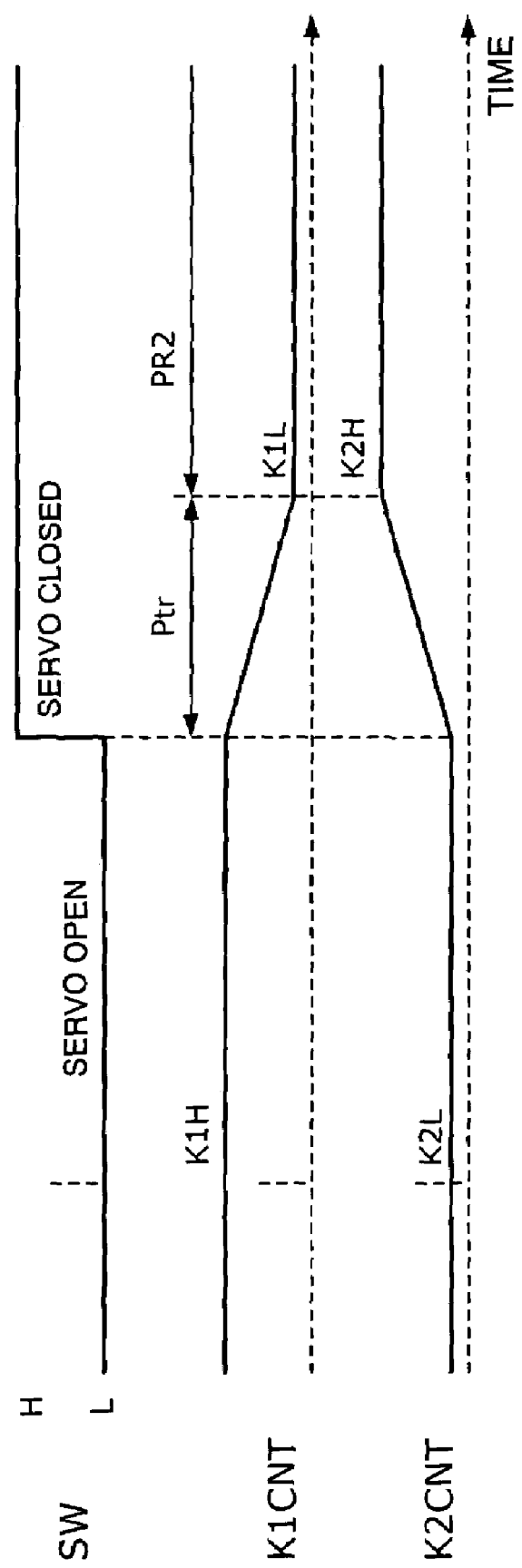
FIG. 6 is a timing chart when the length of a first period is zero.

Further, the length of the first period may be zero. In other words, referring to FIG. 6, the gains may be adjusted so that the linear control component is gradually increased immediately after switching to closed mode and also the nonlinear control component is gradually decreased after the switching to servo close so that the linear control component is lager than the nonlinear control component. Alternatively, as will be described later, the length of the transition period may be zero. In other words, the gains of the linear control and the nonlinear control may be switched to the gains K2H and K1L of the second period, respectively, after the elapse of the first period.

Figure 7:
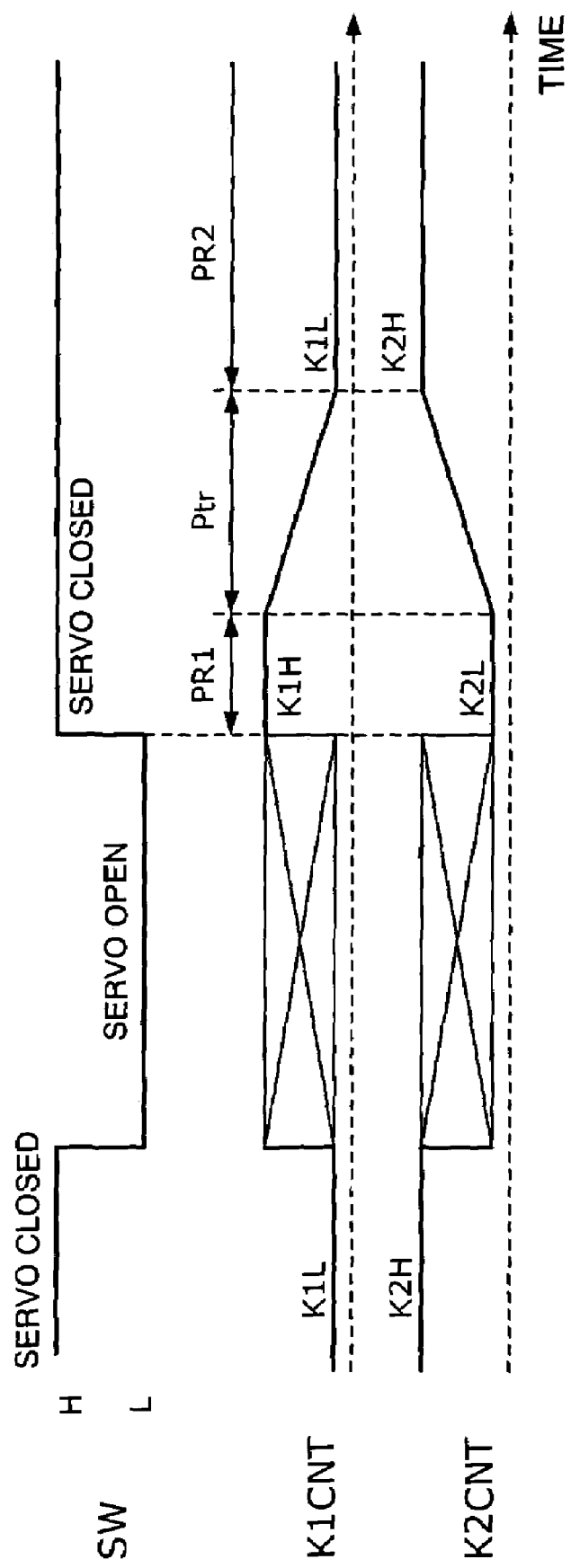
FIG. 7 is a timing chart for the setting of a linear control gain and a nonlinear control gain when servo is in open mode.

Referring now to FIG. 7, the linear control gain and the nonlinear control gain in open mode may be set in any ways.

The conventional control using only a linear phase compensator tends to become unstable immediately after the loop selection signal SW changes from L-level to H-level to close the servo. Accordingly, in order to achieve higher response, it is necessary in the control using only the linear phase compensator to increase the gain of the linear phase compensator to expand the band of the feedback control to a high-frequency band. However, there is a limitation to make the control band of the linear phase compensator higher because of phase delay due to higher resonance of an actuator which is the target of the control, making it difficult to increase the response speed.

According to the embodiment, however, the nonlinear control allows high-speed servo pull-in and reduces the unstable chattering and so on after the servo pull-in. The disturbance due to the change of the gain is not applied, allowing stable control. In other words, since the nonlinear control component is increased during the servo pull-in period from the feedback control start time after shifting to closed mode to the steady state, high-speed stable servo pull-in is allowed. Also stable writing or reading operation is allowed under servo control in which the linear control is dominant. This allows high speed and stable read/write position control and also the reduction of power consumption, as described above.

SECOND EMBODIMENT

The configuration of a tracking-servo controller according to a second embodiment of the present invention and the servo pull-in operation will be described in detail with reference to the drawings. A description of similar or equivalent components and operations to those of the first embodiment will be omitted.

Figure 8:
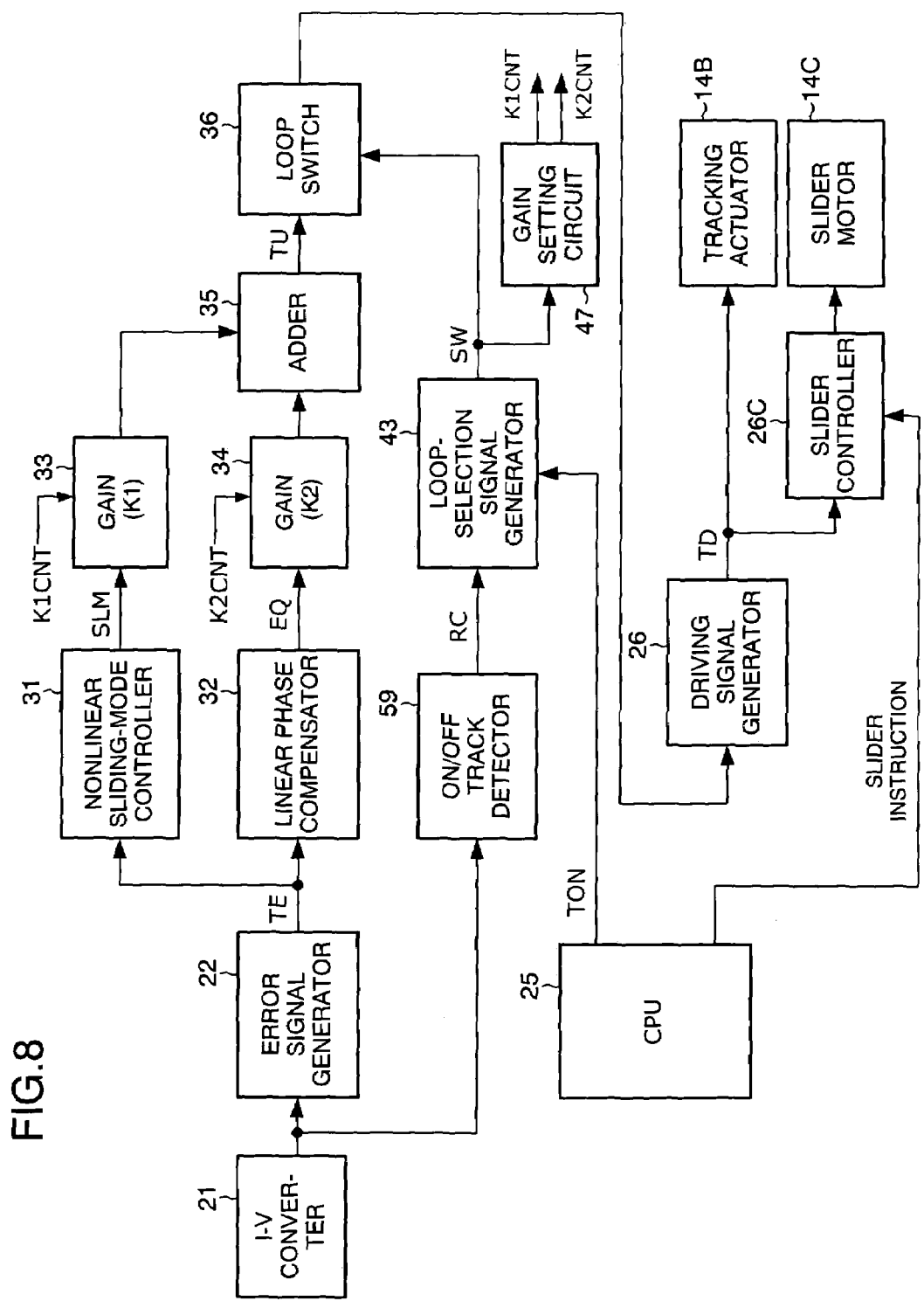
FIG. 8 is a block diagram of the configuration of a tracking-servo controller according to a second embodiment of the present invention.

Referring to FIG. 8, the embodiment is the same as the first embodiment in that the first control system (nonlinear control system) and the second control system (linear control system) are provided. Specifically, the tracking error signal TE from the error signal generator 22 is supplied to the nonlinear sliding-mode controller 31 and the linear phase compensator 32 and amplified by the amplifiers 33 and 34 having the gains K1 and K2, respectively. The amplified nonlinear and linear control signals are added by the adder 35. The add signals are supplied to the loop switch 36 as a position control input TU.

The position control input TU is supplied to the driving signal generator 26 through the loop switch 36, in which the tracking driving signal TD is given. The tracking actuator 14B in the pickup driver 14 is driven by the tracking driving signal TD, so that the tracking position of the objective lens which is a controlled object is controlled.

The tracking driving signal TD is supplied also to a slider controller 26C. The slider controller 26C drives the slider motor 14C according to the tracking driving signal TD under the control of the CPU 25.

Figure 9:
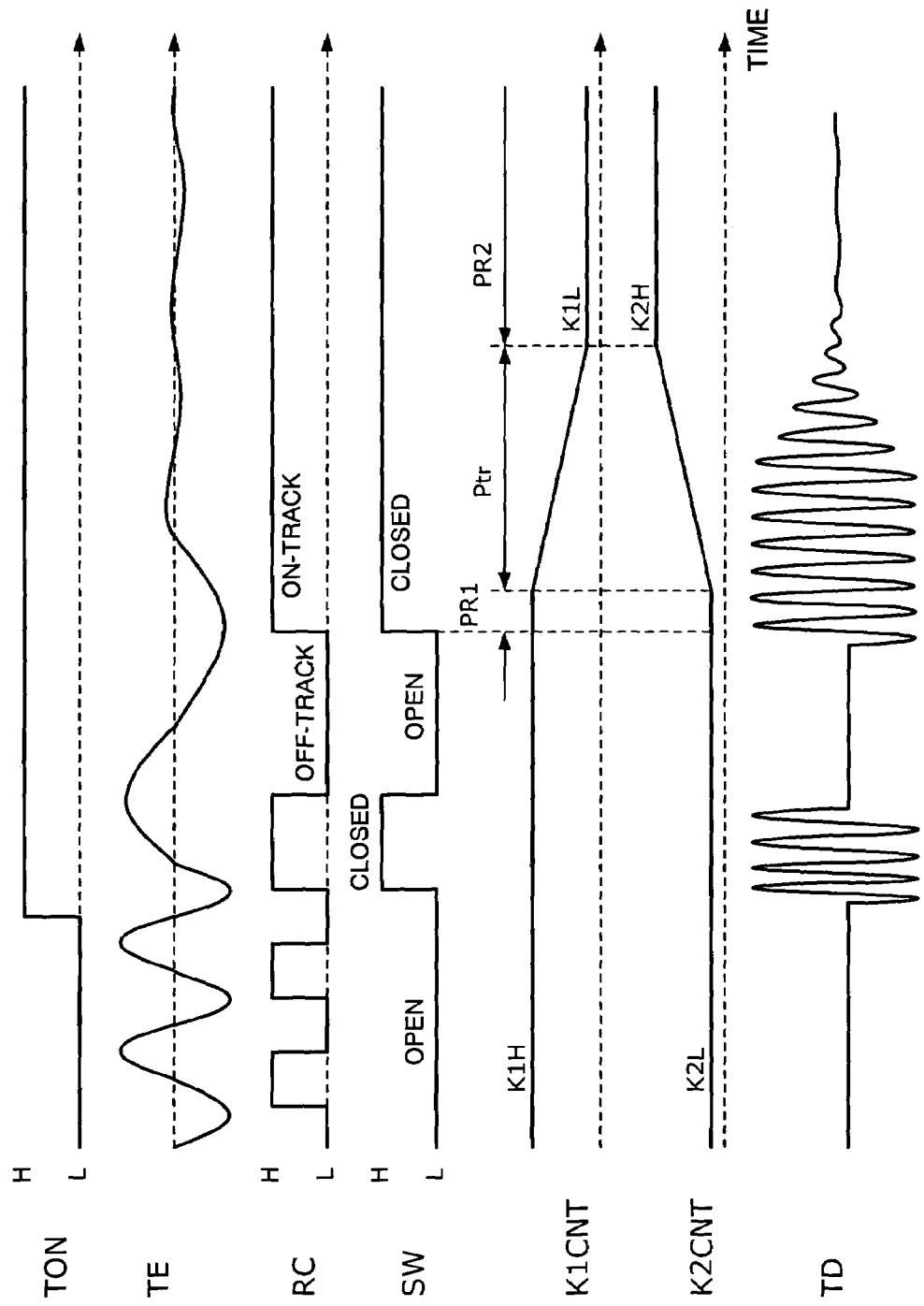
FIG. 9 is timing chart for the drawing operation of the tracking-servo controller according to the second embodiment of the present invention.

Referring to the timing chart of FIG. 9, the pull-in operation of the tracking servo control will be described in detail.

When a tracking position shifts, the amount of light incident on the divided detector varies by the refraction by the pits formed in the disc. Thus, the tracking error signal TE varies. When a tracking-servo start instruction is issued by the CPU 25, a tracking-servo start signal TON changes from a low level (L-level) to a high level (H-level). When the tracking-servo start signal TON is at L-level, the loop-selection signal generator 43 sets the loop selection signal SW at L-level, regardless of the level of the detection signal RC of an ON/OFF track detector 59, to bring the servo loop to open mode.

When the tracking-servo start signal TON reaches H-level, the loop-selection signal generator 43 sets the loop selection signal SW at L-level when the detection signal RC of the ON/OFF track detector 59 is at L-level. On the other hand, when the detection signal RC is at H-level, the loop selection signal SW is set to H-level to bring the servo loop to closed mode.

In response to the change of the loop selection signal SW from L-level to H-level, the gain setting circuit 47 generates the gain control signal K1CNT such that the gain K1 of the first amplifier 33 in the nonlinear control system (nonlinear sliding-mode controller) gradually decreases from the initial gain K1H (high gain) to the low gain K1L after the elapse of a predetermined time and also generates the gain control signal K2CNT such that the gain K2 of the second amplifier 34 in the linear control system (linear phase compensator) gradually increases from the initially set gain K2L (low gain) to become the high gain K2H after the elapse of a predetermined time.

Specifically, the servo is controlled so that the nonlinear control (sliding-mode control) is dominant at the time of switching to closed mode. In other words, it is controlled so that the component of the nonlinear control is larger than that of the linear control during the first period PR1 after the switching to closed mode. The gains are adjusted so that the linear control component is increased gradually relative to the non linear control component during the transition period Ptr after the elapse of the first period. The gains are also adjusted so that the linear control component and the nonlinear control component are constant during the second period PR2 after the linear control component and the nonlinear control component have reached predetermined values (the respective gains of the linear control and the nonlinear control reach K2H and K1L, respectively).

Therefore, according to the embodiment, the nonlinear control allows high-speed servo pull-in and reduces the unstable chattering and so on after the servo pull-in. The disturbance due to the change of the gain is not applied, allowing stable control. In other words, since the nonlinear control component is increased during the servo pull-in period from the feedback control start time after shifting to closed mode to the steady state, high-speed and stable servo pull-in is allowed. Also stable writing or reading operation is allowed under servo control in which the linear control is dominant. This allows high speed and stable read/write position control and also the reduction of power consumption.

THIRD EMBODIMENT

Referring to the block diagram of FIG. 10 and the timing chart of FIG. 11, the configuration of a position controller applied to a focus jump control and the control operation will be described in detail. A description of similar or equivalent components and operations to those of the above-described embodiments will be omitted.

For example, when a multilayer disc having two recording layers is written or read, the need arises to change the light-beam focusing position from a first recording layer (L0-layer) to a second recording layer (L1-lyaer). The shift of the light-beam focusing position between the recording layers is generally referred to as focus jump.

Figure 10:
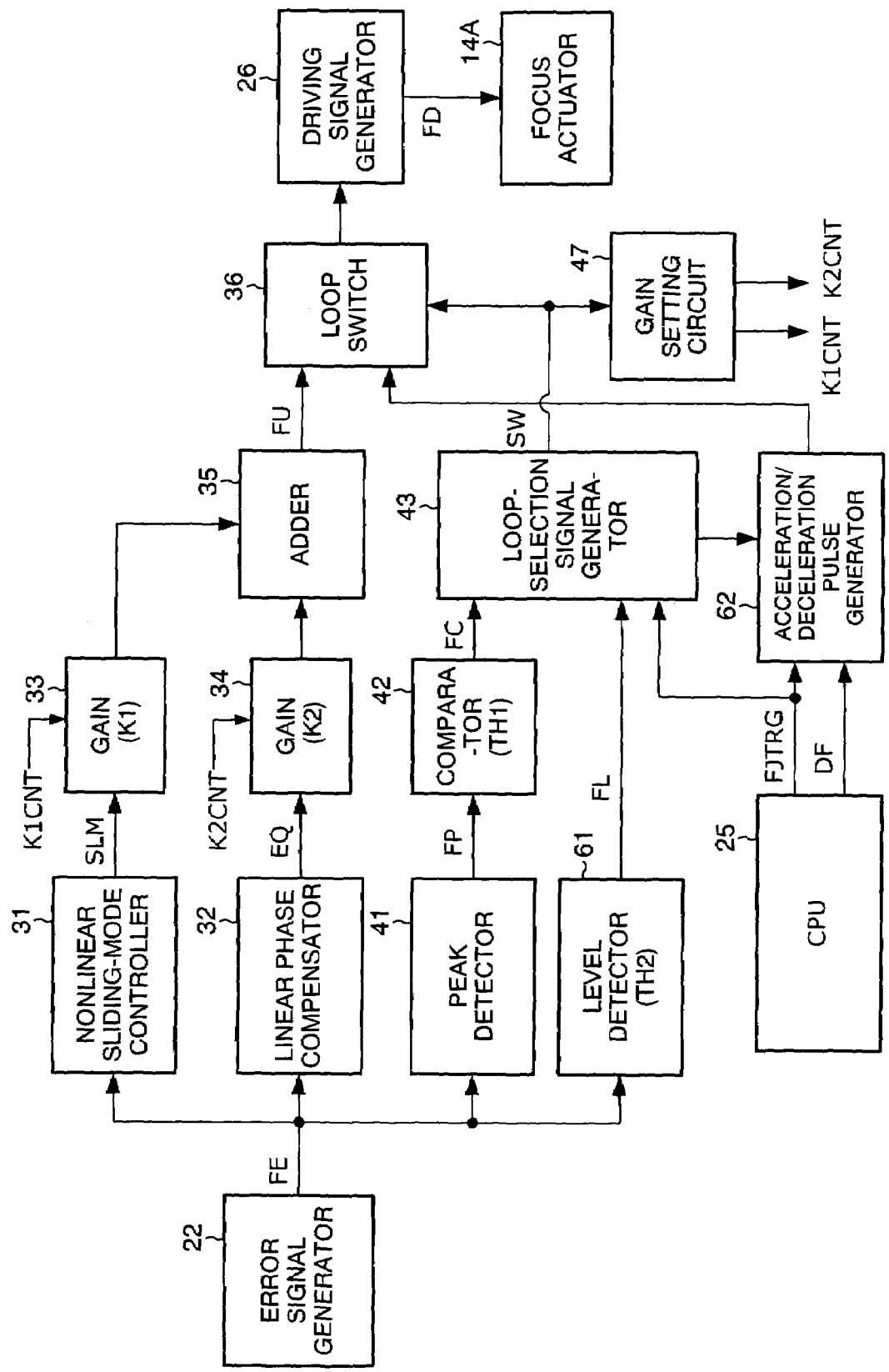
FIG. 10 is a block diagram of the configuration of a focus jump controller according to a third embodiment of the present invention.
Figure 11:
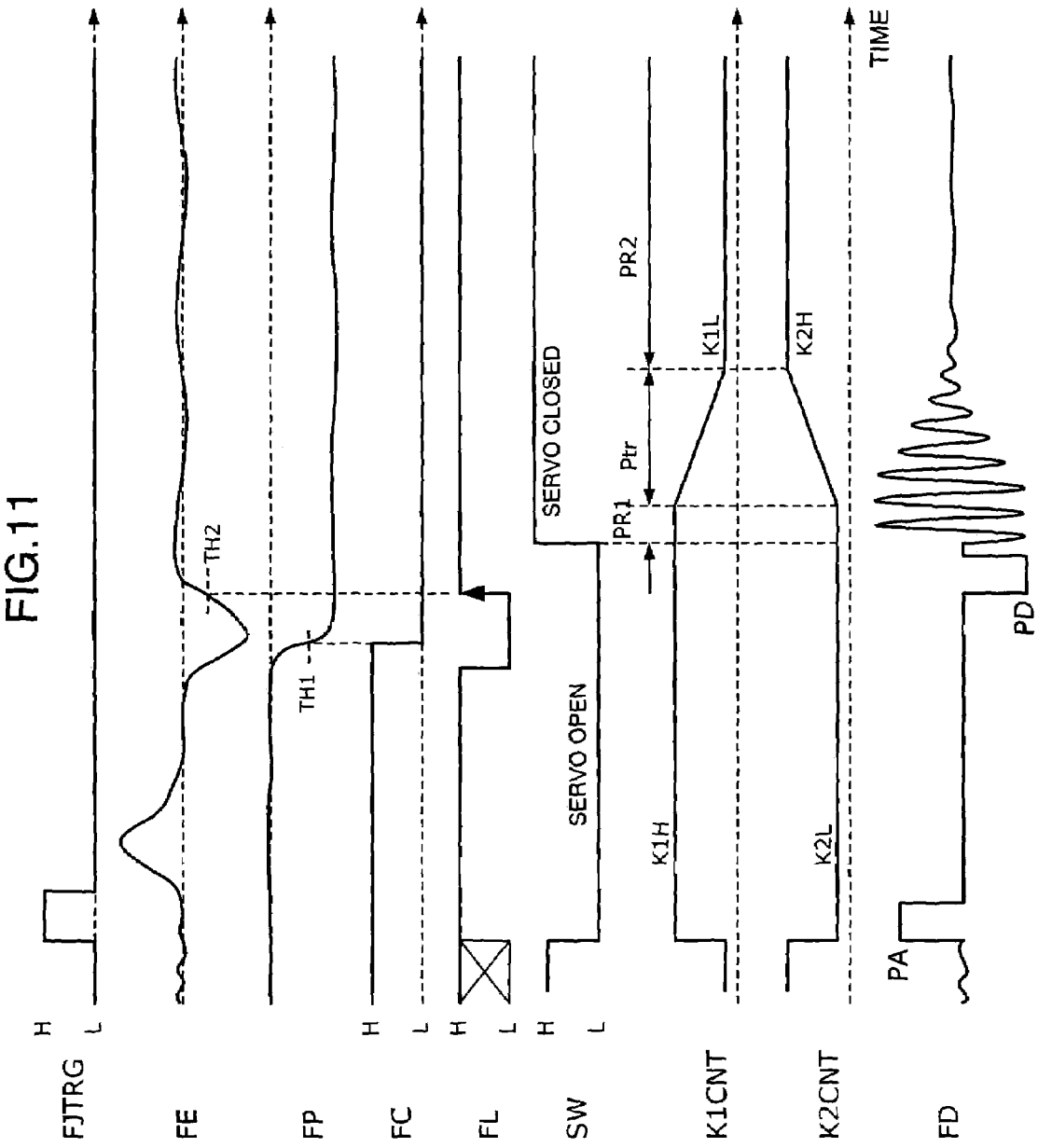
FIG. 11 is a timing chart for the operation of the focus jump controller according to a third embodiment of the present invention.

FIG. 10 is a detailed block diagram of the configuration of focus jump, particularly, the configuration of the pickup drive controller 23. In the above-described first embodiment, the position of the objective lens is controlled by using a sawtooth wave while the servo loop remained open. Also a case is described in which the timing of changing the servo control from open mode to closed mode is determined by detecting a zero-crossing. In this embodiment, the objective lens is driven by using an acceleration pulse and a deceleration pulse to change the light-beam focusing point. In this embodiment, a case is described in which the timing of changing the servo control from open mode to closed mode is determined by level detection.

The CPU 25 determines which recording layer the focus jump target is, or whether the target is a shallower recording layer (i.e., adjacent to a disc surface) or a deeper recording layer, and transmits a direction indication signal DF that gives an indication for the direction of changing the focusing position to an acceleration/deceleration pulse generator 62. The CPU 25 also generates a trigger signal FJTRG instructing to perform focus jump. When the trigger signal FJTRG is issued, the loop-selection signal generator 43 changes the loop selection signal SW from H-level to L-level to bring the servo control into open mode. The loop switch 36 connects the output of the acceleration/deceleration pulse generator 62 to the driving signal generator 26.

The acceleration/deceleration pulse generator 62 sets a polarity responding to the direction indication signal DF. When the trigger signal FJTRG is generated, the acceleration/deceleration pulse generator 62 generates an acceleration pulse PA and outputs the pulse. In accordance with the acceleration pulse PA, the objective lens is accelerated and the focus error signal FE forms an S-shaped error waveform. The peak detector 41 detects the peak of the focus error signal FE and sends the detection signal FP to the comparator 42. The comparator 42 compares the value of the detection signal FP with a predetermined reference value TH1 and outputs the comparison signal FC. A level detector 61 compares the level of the focus error signal FE with a predetermined reference value TH2 and outputs a level detection signal FL.

When the comparison signal FC changes from H-level to L-level (i.e., when it is detected that the detection signal FP becomes smaller than the reference value TH1) and the level detection signal FL changes from L-level to H-level (i.e., when it is detected that the focus error signal FE becomes larger than the reference value TH2), the loop-selection signal generator 43 instructs the acceleration/deceleration pulse generator 62 to output a deceleration pulse PD. The acceleration/deceleration pulse generator 62 outputs the deceleration pulse PD with a polarity according to the direction indication signal DF, in response to the instruction. After the deceleration pulse PD has been output, the loop-selection signal generator 43 changes the loop selection signal SW from L-level to H-level to change the servo control from open mode to closed mode.

When the loop selection signal SW is at L-level, the gain setting circuit 47 sets the gain K1 of the first amplifier 33 on the side of the nonlinear sliding-mode controller 31 to the high gain K1H and the gain K2 of the second amplifier 34 on the side of the linear phase compensator 32 to the low gain K2L. The gain setting circuit 47 detects that the loop selection signal SW has changed from L-level to H-level and generates the gain control signal K1CNT such that the gain K1 of the first amplifier 33 on the side of the nonlinear sliding-mode controller 31 gradually decreases from the initial gain K1H to the low gain K1L after the elapse of a predetermined time and also generates the gain control signal K2CNT such that the gain K2 of the second amplifier 34 in the linear control system gradually increases from the initially set gain K2L to become the high gain K2H after the elapse of a predetermined time.

Specifically, the servo is controlled so that the nonlinear control (sliding-mode control) is dominant (i.e., larger than the linear control) or absolutely predominant at the time of switching to closed mode. Then, it is controlled so that the linear control becomes dominant (i.e., larger than the nonlinear control) or absolutely predominant gradually after the switching to closed mode.

Therefore, according to the embodiment, the nonlinear control allows high-speed and stable servo pull-in. In the steady state after the servo pull-in, stable focus servo control can be continued with low power consumption in the state in which linear control is predominant.

Figure 12:
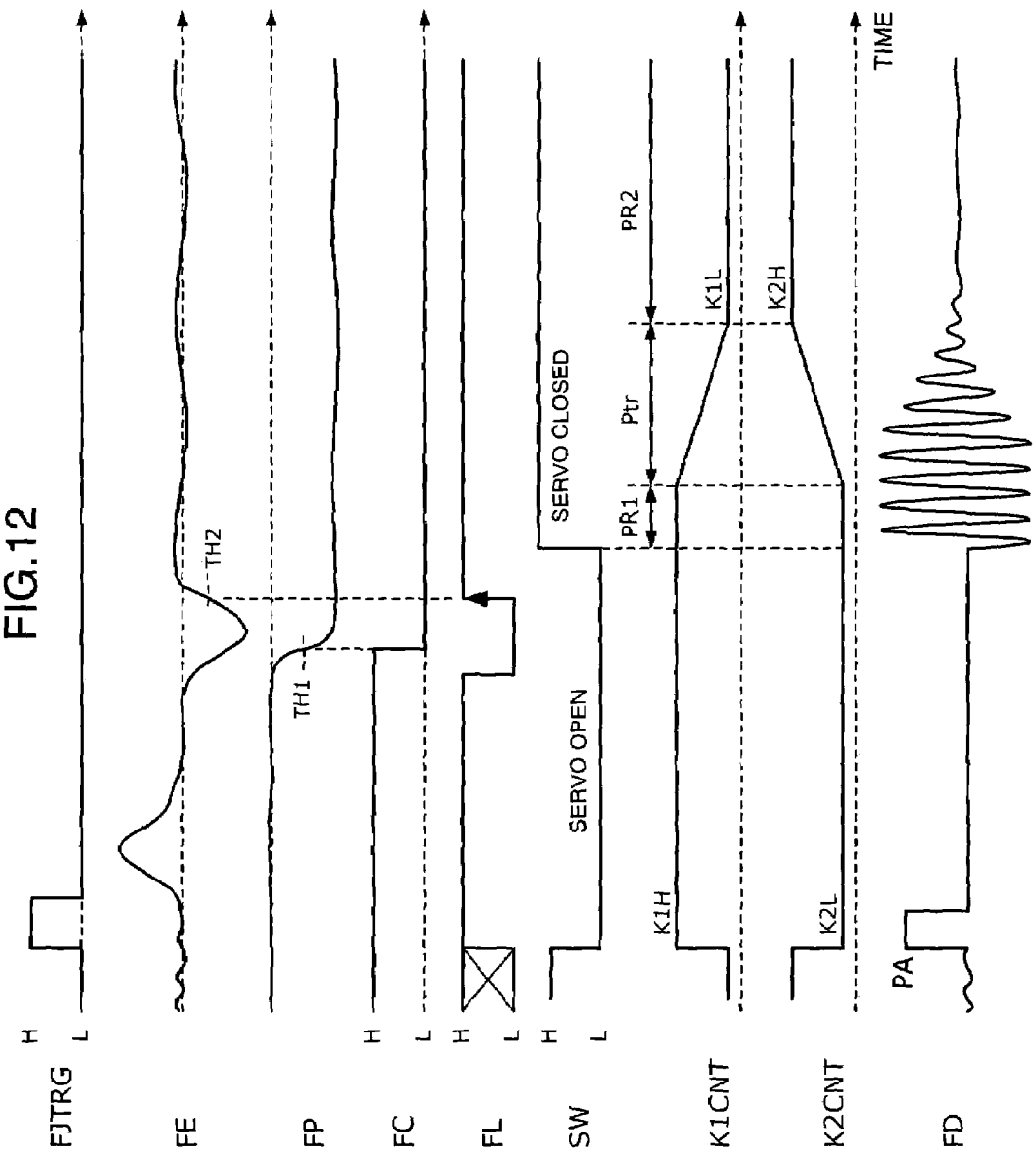
FIG. 12 is a timing chart for the operation of a modification of the focus jump controller according to the third embodiment of the present invention.

Modifications of this embodiment include a configuration in which the acceleration/deceleration pulse generator 62 shown in FIG. 10 is replaced with an acceleration pulse generator for generating the acceleration pulse PA. In this case, referring to the timing chart of FIG. 12, when the peak detection signal FP for the focus error signal FE is at L-level and the level detection signal FL changes from L-level to H-level, the loop selection signal SW is changed from L-level to H-level without generating a deceleration pulse to change the servo to closed mode.

Specifically, during the time period after the start of the feedback control to the steady state, the nonlinear control is made predominant over the linear control, thus allowing high-speed servo pull-in. Then the control is shifted to the state in which the linear control is predominant, in which servo control is performed. This allows high-speed focus jump and focusing of the pickup to a target position and, after arrival to the target position, stable and high-accuracy read/write operation can be started and performed by servo control.

FOURTH EMBODIMENT

Referring to the block diagram of FIG. 13 and the timing chart of FIG. 14, the configuration of a position controller applied to a track jump control and its control operation will be described in detail. A description of similar or equivalent components and operations to those of the above-described embodiments will be omitted.

Figure 13:
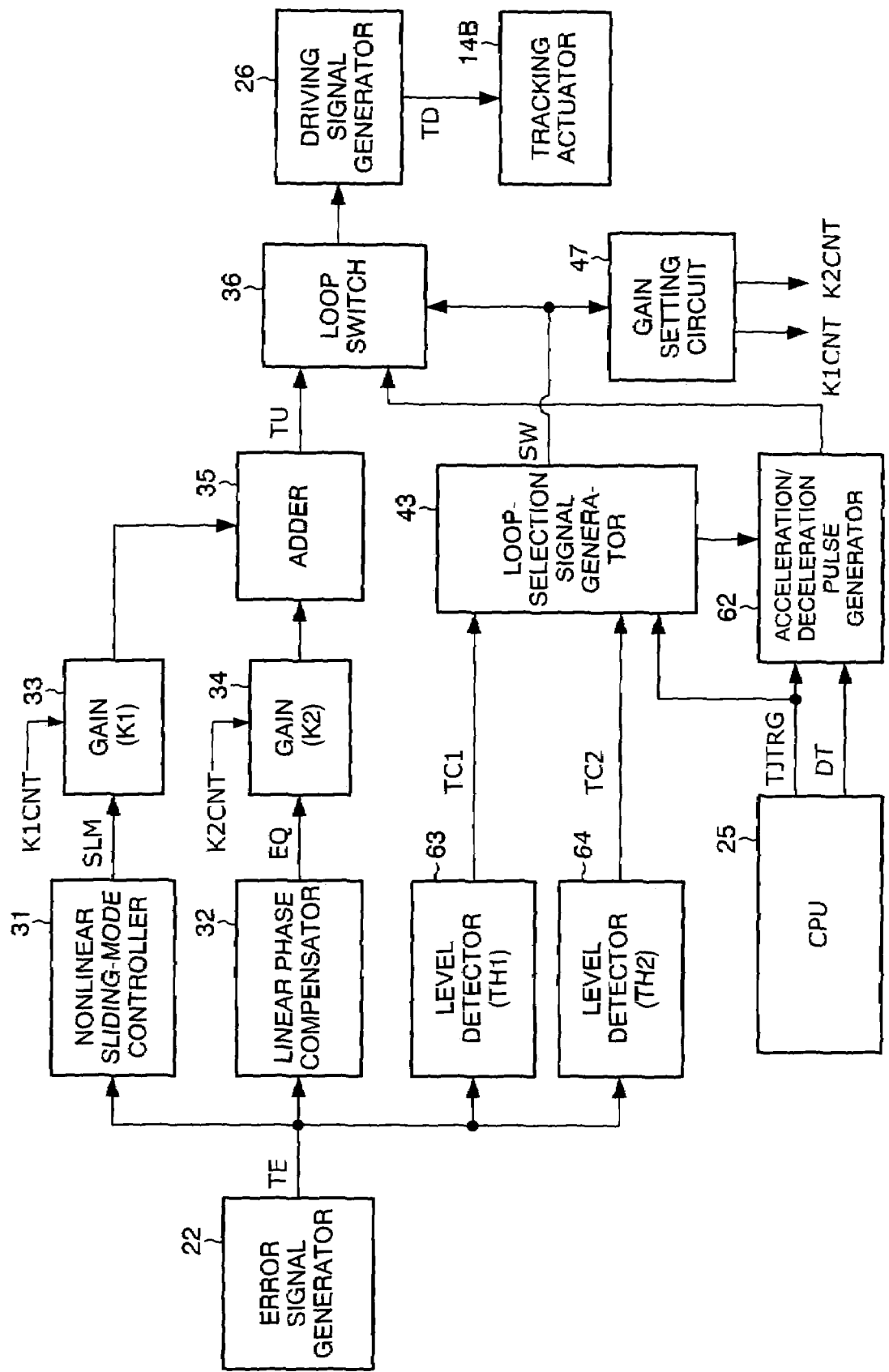
FIG. 13 is a block diagram of the configuration of a track jump controller according to a fourth embodiment of the present invention.
Figure 14:
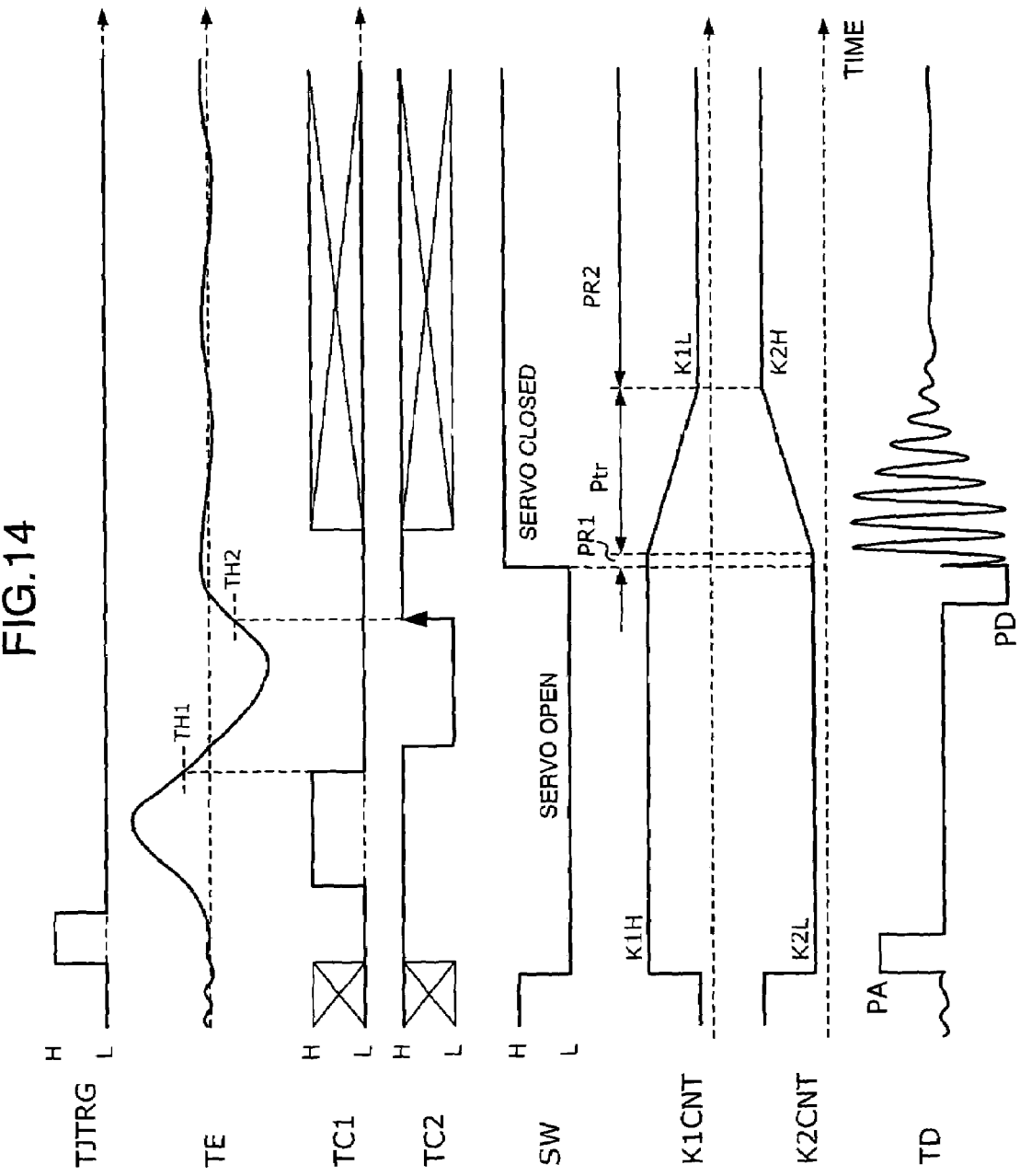
FIG. 14 is a timing chart for the operation of the track jump controller according to the fourth embodiment of the present invention.

FIG. 13 is a detailed block diagram of the configuration for performing track jump, particularly, the configuration of the pickup drive controller 23.

The CPU 25 first determines whether the direction of track jump is in the direction of the inner radius of the optical disc 11 or that of the outer radius and transmits a direction indication signal DT depending on the determination result to the acceleration/deceleration pulse generator 62. The CPU 25 also generates a trigger signal TJTRG instructing to perform track jump. When the trigger signal TJTRG is generated, the loop-selection signal generator 43 changes the loop selection signal SW from H-level to L-level to temporarily bring the servo control into open mode. The loop switch 36 connects the output of the acceleration/deceleration pulse generator 62 to the driving signal generator 26.

The acceleration/deceleration pulse generator 62 sets a polarity according to the direction indication signal DT. When the trigger signal TJTRG is issued, the acceleration/deceleration pulse generator 62 generates the acceleration pulse PA and outputs the pulse. In accordance with the acceleration pulse PA, the objective lens is accelerated and the tracking error signal TE exhibits an S-shaped error waveform. A level detector 63 compares the level of the tracking error signal TE with the predetermined reference value TH1 and outputs a comparison signal TC1. A level detector 64 compares the level of the tracking error signal TE with the predetermined reference value TH2 and outputs a comparison signal TC2. When the comparison signal TC1 changes from H-level to-L-level and the comparison signal TC2 changes from L-level to H-level, the loop-selection signal generator 43 instructs the acceleration/deceleration pulse generator 62 to output the deceleration pulse PD. The acceleration/deceleration pulse generator 62 outputs the deceleration pulse PD with a polarity according to the direction indication signal DT in response to the instruction. After the deceleration pulse PD has been output, the loop-selection signal generator 43 changes the loop selection signal SW from L-level to H-level to change the servo control from an open mode to a closed mode.

When the loop selection signal SW is at L-level, the gain setting circuit 47 sets the gain K1 of the first amplifier 33 on the side of the nonlinear sliding-mode controller 31 to the high gain K1H and the gain K2 of the second amplifier 34 on the side of the linear phase compensator 32 to the low gain K2L. The gain setting circuit 47 detects that the loop selection signal SW has changed from L-level to H-level and generates the gain control signal K1CNT such that the gain K1 of the first amplifier 33 on the side of the nonlinear sliding-mode controller 31 gradually decreases from the initial gain K1H to the low gain K1L after the elapse of a predetermined time and also generates the gain control signal K2CNT such that the gain K2 of the second amplifier 34 in the linear control system gradually increases from the initially set gain K2L to become the high gain K2H after the elapse of a predetermined time.

Specifically, during the time period after the start of the feedback control to the steady state, the nonlinear control is made predominant over the linear control, thus allowing high-speed servo pull-in. Then the control is shifted to the state in which the linear control is predominant, in which servo control is performed to allow stable focus servo control to be continued with low power consumption. Also, disturbance due to gain change is not applied, allowing stable control.

The track jump control of the embodiment may be combined to the focus jump control of the third embodiment.

Figure 15:
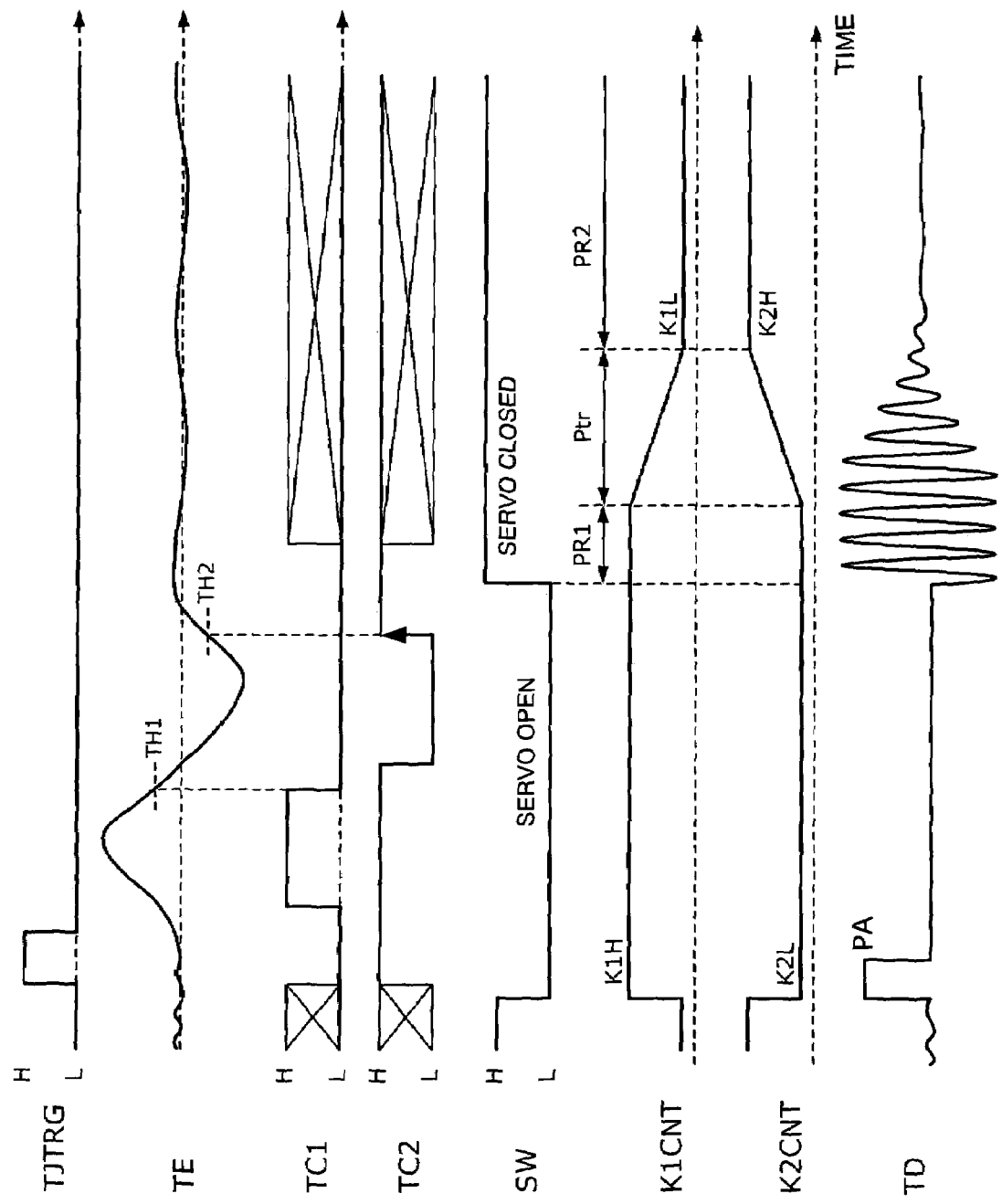
FIG. 15 is a timing chart for the operation of a modification of the track jump controller according to the fourth embodiment of the present invention.

Modifications of this embodiment include a configuration in which the acceleration/deceleration pulse generator 62 shown in FIG. 13 is replaced with an acceleration pulse generator for generating the acceleration pulse PA. In this case, referring to the timing chart of FIG. 15, when the comparison signal TC1 for the tracking error signal TE is at L-level and the comparison signal TC2 changes from L-level to H-level, the loop selection signal SW is changed from L-level to H-level without generating a deceleration pulse to shift the servo to closed mode.

With such a configuration, the nonlinear control allows high-speed servo pull-in at the start of servo pull-in and reduces unstable chattering and so on after the servo pull-in. Accordingly, high-speed track jump and tracking to a target position can be achieved and, after arrival to the target position, stable and high-performance read/write operation can be started and performed by servo control in which linear control is predominant.

FIFTH EMBODIMENT

Figure 16:
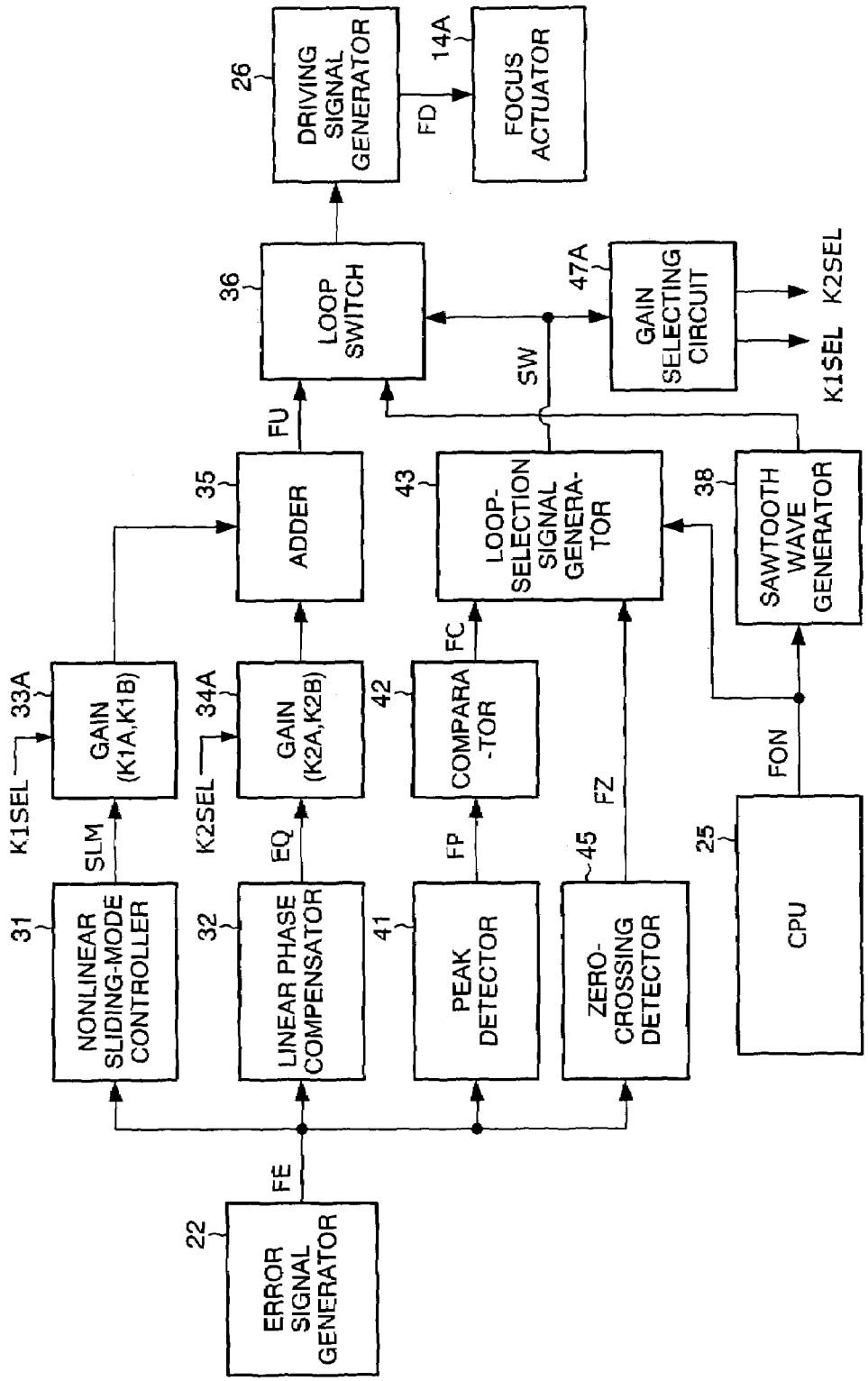
FIG. 16 is a block diagram of the configuration of a focus servo controller according to a fifth embodiment of the present invention
Figure 17:
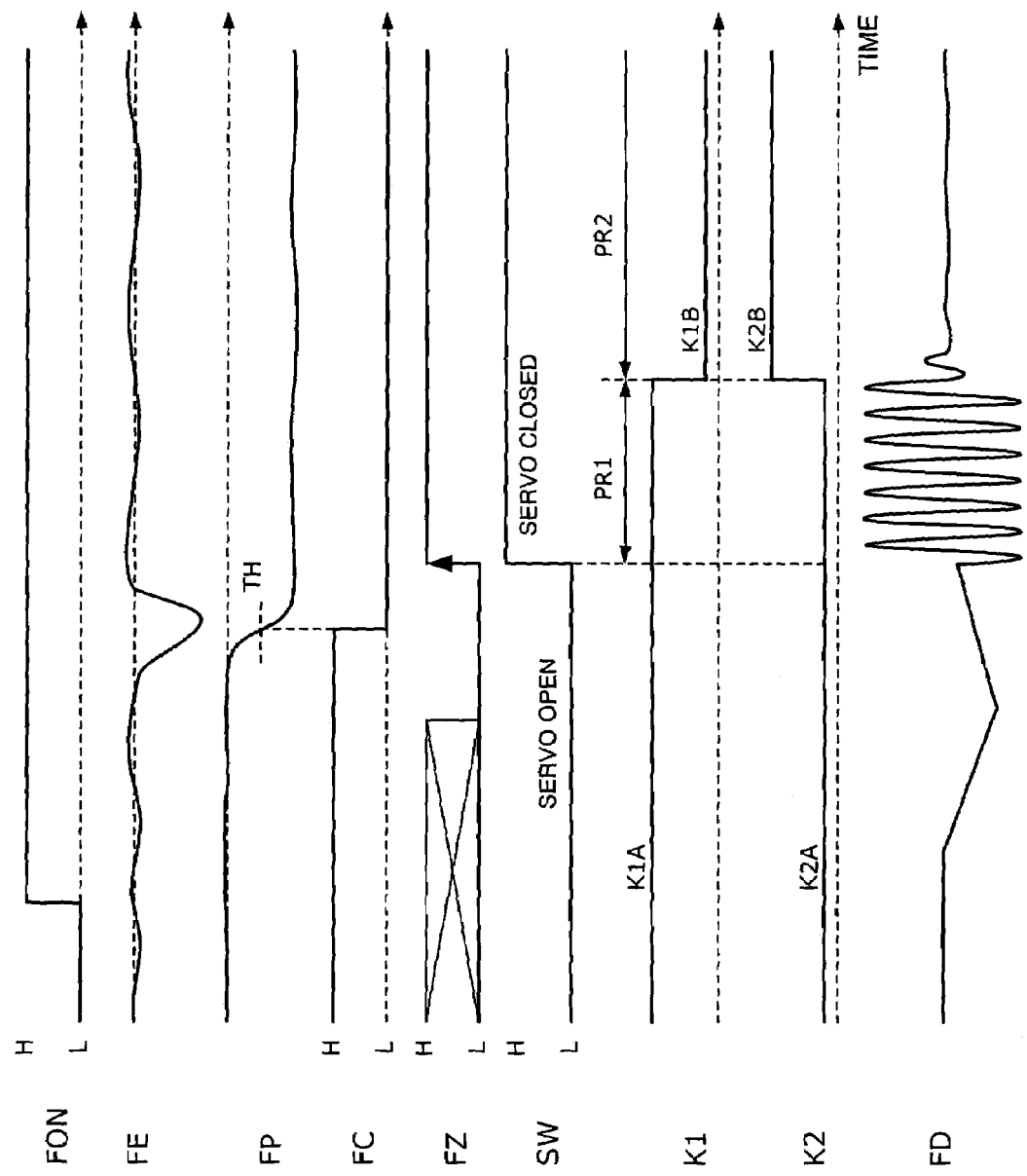
FIG. 17 is a timing chart for the operation of the focus servo controller according to the fifth embodiment of the present invention.

A embodiment of the servo pull-in will be described hereinafter. FIG. 16 shows the configuration of a position controller applied to a focus servo control. FIG. 17 shows the timing chart for its control operation. A description of similar or equivalent components and operations to those of the above-described embodiments will be omitted.

The first embodiment has been described when the gain K1 of the nonlinear control system (sliding-mode controller) and the gain K2 of the linear control system (linear phase compensator) are changed step by step or gradually by using the gain setting circuit 47. The method of changing the gain K1 and the gain K2, however, is not limited to that.

Referring to FIGS. 16 and 17, for example, a gain selecting circuit 47A may selectively set the gain K1 of the nonlinear control system to either one of gains K1A and K1B. Similarly, the gain selecting circuit 47A may selectively set the gain K2 of the linear control system to either one of gains K2A and K2B. Briefly, the gain selecting circuit 47A may switch abruptly between the gain K1 of the nonlinear control system and/or the gain K2 of the linear control system.

More specifically, when the loop selection signal SW is at L-level, the gain selecting circuit 47A sets the high gain K1A as the initial gain of an amplifier 33A of the nonlinear control system (on the side of the nonlinear sliding-mode controller 31) and sets the low gain K2A as the initial gain of an amplifier 34A of the linear control system (on the side of the linear phase compensator 32). The gain selecting circuit 47A detects that the loop selection signal SW has changed from L-level to H-level. After the detection, the gain selecting circuit 47A generates a selection control signal K1SEL such that the low gain K1B is selected as the gain of the nonlinear control system and a selection control signal K2SEL such that the high gain K2B is selected as the gain of the linear control system after the elapse of a predetermined time, thereby controlling the amplifiers 33A and 34A, respectively. As a result, the nonlinear sliding-mode control is dominant during the first period PR1 and the linear control by the linear phase controller is dominant during the second period PR2.

SIXTH EMBODIMENT

The description has been made for the focus servo control in the above-described fifth embodiment. Also for the tracking servo control, however, the pull-in control by selecting the gains of the nonlinear control system and the linear control system is possible.

Figure 18:
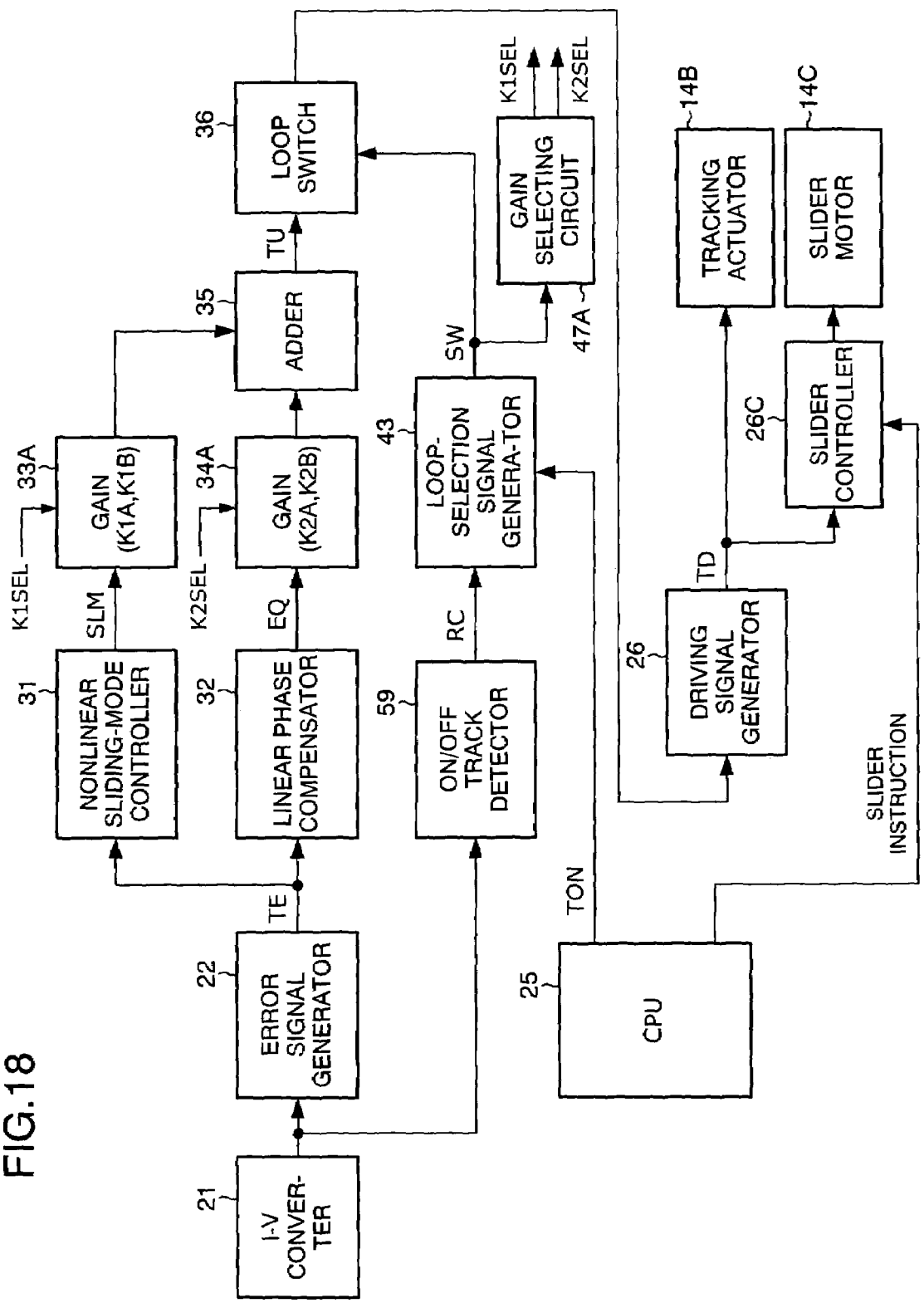
FIG. 18 is a block diagram of the configuration of a tracking-servo controller according to a sixth embodiment of the present invention.
Figure 19:
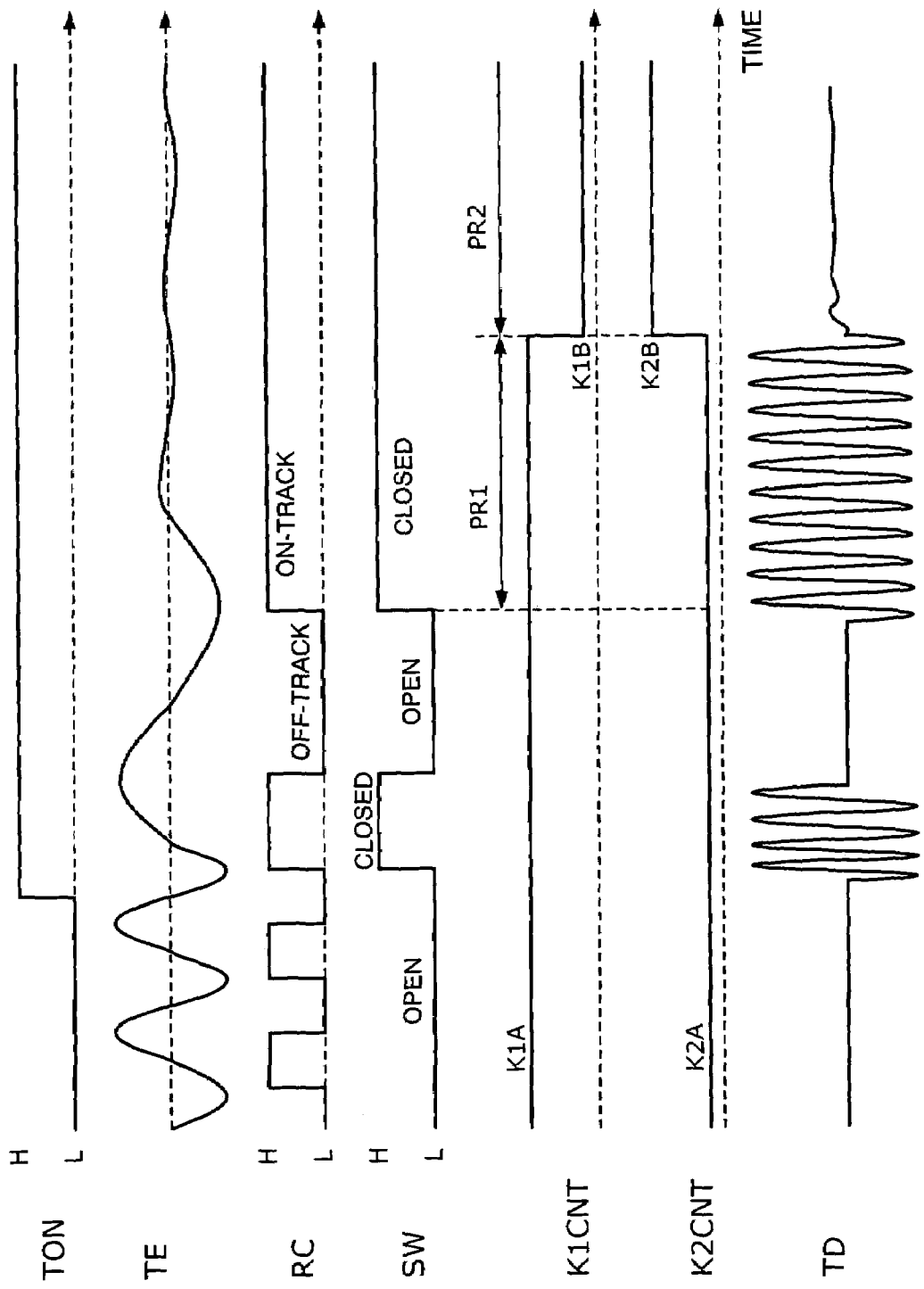
FIG. 19 is a timing chart for the operation of the tracking-servo controller according to the sixth embodiment of the present invention.

FIG. 18 shows the configuration of a position controller applied to the tracking servo control. FIG. 19 shows the timing chart for the control operation. A description of similar or equivalent components and operations to those of the above-described embodiments will be omitted.

When a tracking-servo start instruction is issued by the CPU 25, a tracking-servo start signal TON changes from L-level to H-level. When the tracking-servo start signal TON is at L-level, the loop-selection signal generator 43 sets the loop selection signal SW at L-level regardless of the level of the detection signal RC of the ON/OFF track detector 59 to make the servo loop open.

When the tracking-servo start signal TON becomes H-level, the loop-selection signal generator 43 sets the loop selection signal SW at L-level when the detection signal RC of the ON/OFF track detector 59 is at L-level. On the other hand, when the detection signal RC is at H-level, the loop selection signal SW is set at H-level to make the servo loop closed.

Referring to FIG. 19, when the loop selection signal SW is at L-level, the gain selecting circuit 47A sets the high gain K1A as the initial gain of the amplifier 33A of the nonlinear control system (on the side of the nonlinear sliding-mode controller 31) and sets the low gain K2A as the initial gain of the amplifier 34A of the linear control system (on the side of the linear phase compensator 32). The gain selecting circuit 47A detects that the loop selection signal SW has changed from L-level to H-level. After the detection, the gain selecting circuit 47A generates the selection control signal KLSEL such that the low gain K1B is selected as the gain of the nonlinear control system and the selection control signal K2SEL such that the high gain K2B is selected as the gain of the linear control system after the elapse of a predetermined time, thereby controlling the amplifiers 33A and 34A, respectively. As a result, the nonlinear-sliding-mode control is dominant in the period PR1 and the linear control by the linear phase compensator is dominant in the period PR2.

The embodiments have been described for the case in which the timing of decreasing the nonlinear control component and the timing of increasing the linear control component are coincident with each other; however, they may not necessarily coincide with each other. Also, the timing at which the linear control component becomes constant may not necessarily be coincident with the timing at which the nonlinear control component becomes constant. Specifically, it is sufficient to control the gains of the nonlinear control system and the linear control system so as to switch from the state in which the nonlinear control is predominant to the linear control to the state in which the linear control is predominant to the nonlinear control after switching to closed mode.

SEVENTH EMBODIMENT

The configuration of a servo controller and a servo pull-in operation according to a seventh embodiment of the present invention will be described in detail with reference to the drawings. In this embodiment, the servo controller performs tracking servo control and focus servo control. A description of similar or equivalent components and operations to those of the above-described embodiments will be omitted.

Figure 20:
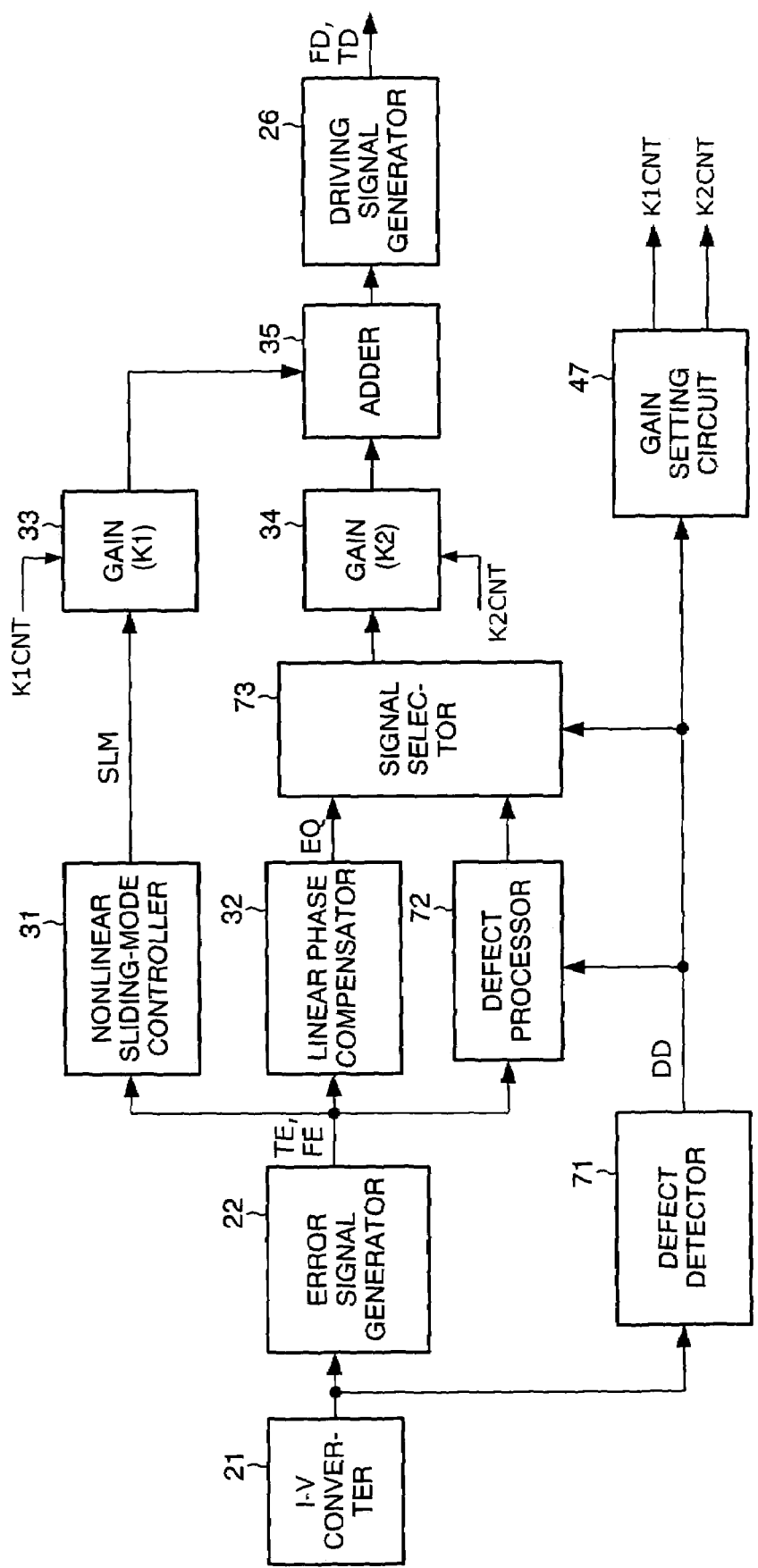
FIG. 20 is a block diagram of the configuration of a servo controller according to a seventh embodiment of the present invention.

Referring to FIG. 20, the servo controller of this embodiment is the same as the above-described embodiments in that the first control system (nonlinear control system) and the second control system (linear control system) are provided. The servo controller of this embodiment will be described in detail hereinafter.

The I-V converter 21 converts a light reception signal from the photodetector 15 to a voltage signal. The converted read voltage signal is supplied to the error signal generator 22. The error signal generator 22 generates the focus error signal FE and the tracking error signal TE. The error signals TE and FE from the error signal generator 22 are supplied to the nonlinear sliding-mode controller 31, in which the nonlinear control signal SLM is generated. The nonlinear control signal SLM is supplied to the first amplifier 33 (gain K1) and is amplified. The error signals TE and FE are also supplied to the linear phase compensator 32 and a later-described defect processor 72.

Figure 21:
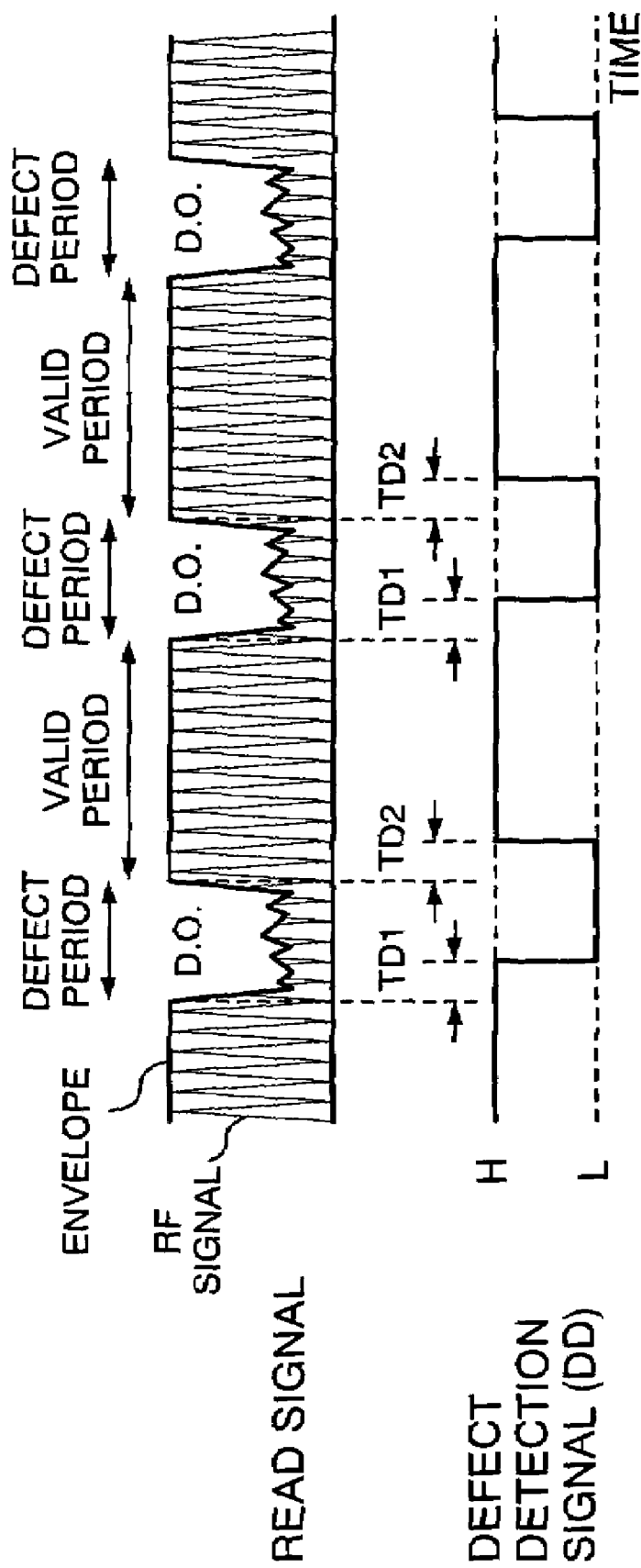
FIG. 21 is an explanatory diagram of a read signal and a defect detection signal of the controller of FIG. 20.

The read RF signal from the I-V converter 21 is supplied to a defect detector 71. The defect detector 71 detects a defect using the read RF signal and outputs a defect detection signal DD. FIG. 21 illustrates the read RF signal and the defect detection signal DD. Dropouts (D.O.) due to a defect occur in the RF signal. For example, the upper level of the RF signal drops owing to the defect such as a finger print and so the RF signal has a shape in which the upper part of the signal is lost or dropped out.

More specifically, the defect detector 71 obtains, for example, an envelope signal in which a predetermined high-frequency component is removed by a low pass filter (LPF) (not shown). The defect detector 71 detects defects by detecting that the envelope signal level (envelope level) becomes lower than a predetermined reference value. As shown in the drawing, for example, the defect detection signal DD changes from H-level to L-level when detecting a defect. When the envelope level has returned to the predetermined reference value or more, the level of the defect detection signal changes from L-level to H-level.

Accordingly, during the period from the time the envelope level begins to decrease to the time it reaches the reference value, no defect is detected although a defect occurs actually. In other words, the defect detection signal DD has a delay (detection delay) for the period in which a defect occurs (defect period). Such detection delay occurs at both of the time when the defect is detected (detection delay time: TD1) and the recover time when the defect disappears to make the error signal valid (detection delay time: TD2).

When the defect are generated repeatedly and the occurrence interval is short (or the valid period is short), as described above, it becomes necessary to pull-in the servo into a stable state with high speed and reliability during the valid period between the defects.

The defect processor 72 outputs a servo control signal for processing the defect in response to the defect detection signal DD from the defect detector 71. For example, the defect processor 72 outputs an error value (former-value hold) before the detection of the defect or the low-frequency component (or integral signal) of the error signal as a servo control signal to a signal selector 73. To the signal selector 73, the linear-phase compensation signal EQ from the linear phase compensator 32 is also supplied.

The signal selector 73 selects either the linear-phase compensation signal EQ or the defect processing signal (for example, the former-value hold signal) from the defect processor 72 in response to the defect detection signal DD and sends it to the second amplifier 34 (gain K2). The selected signal is amplified by the second amplifier 34 and is added to the nonlinear control signal amplified by the first amplifier 33 in the adder 35. The addition signal of the adder 35 is supplied to the driving signal generator 26, in which the focusing driving signal FD and the tracking driving signal TD are generated. The gain K1 of the first amplifier 33 and the gain K2 of the second amplifier 34 are controlled by the gain control signals K1CNT and K2CNT from the gain setting circuit 47, respectively. The gain setting circuit 47 generates the gain control signals K1CNT and K2CNT in response to the defect detection signal DD from the defect detector 71.

Referring now to the timing chart for the signals of FIG. 22, the pull-in operation of the servo control will be described in detail.

The defect detection signal DD from the defect detector 71 changes to L-level by the occurrence of a defect. The signal selector 73 selects the defect processing signal from the defect processor 72 in response to the defect detection signal DD. Defect processing is performed with, for example, the former-value hold scheme, using the error value before the defect detection as the defect processing signal. In this case, the gain setting circuit 47 sets the gain K1 of the first amplifier 33 in the nonlinear control system (or on the side of the nonlinear sliding-mode controller) to zero or an extremely small value. The gain K2 of the second amplifier 34 in the linear control system preferably holds the gain before the defect processing.

The defect detection signal DD changes to H-level by the recovery from the defect period to the valid period (by the termination or disappearance of the defect). The signal selector 73 selects the signal EQ after phase compensation from the linear phase compensator 32 in response to the change of the defect detection signal DD and sends it to the second amplifier 34. The gain setting circuit 47 sets the gain K1 of the first amplifier 33 in the nonlinear control system to the high gain K1H and sets the gain K2 of the second amplifier 34 in the linear control system to the low gain K2L with the gain control signals K1CNT and K2CNT, in response to the change of the defect detection signal DD. This allows the switching from the defect processing to the nonlinear sliding-mode control to be performed.

The gain setting circuit 47 generates the gain control signal K1CNT such that the gain K1 of the first amplifier 33 in the nonlinear control system gradually decreases from the initially set gain K1H (high gain) after the elapse of a predetermined time (first period: PR1) from the time of switching from the defect processing to the nonlinear-sliding-mode control and reaches the low gain K1L after the elapse of a predetermined time (i.e., transition period: Ptr) and also generates the gain control signal K2CNT such that the gain K2 of the second amplifier 34 in the linear control system gradually increases from the initially set gain K2L (low gain) to become the high gain K2H after the elapse of the predetermined time (transition period: Ptr). Thus, the linear control is performed after the elapse of the transition period (during the second period: PR2).

In other words, during the first period (PR1), the nonlinear control component of the servo control is sufficiently larger than the linear control component, in which sliding-mode control is substantially performed. After transition to the transition period Ptr, the linear control component becomes larger than the nonlinear control component, thus making the linear control predominant. Accordingly, after recovery from the defect period to the valid period, rapid pull-in operation is performed by the sliding-mode control, allowing escape from unstable condition in a very short time and shift to linear control, with stable servo control.

Figure 22:
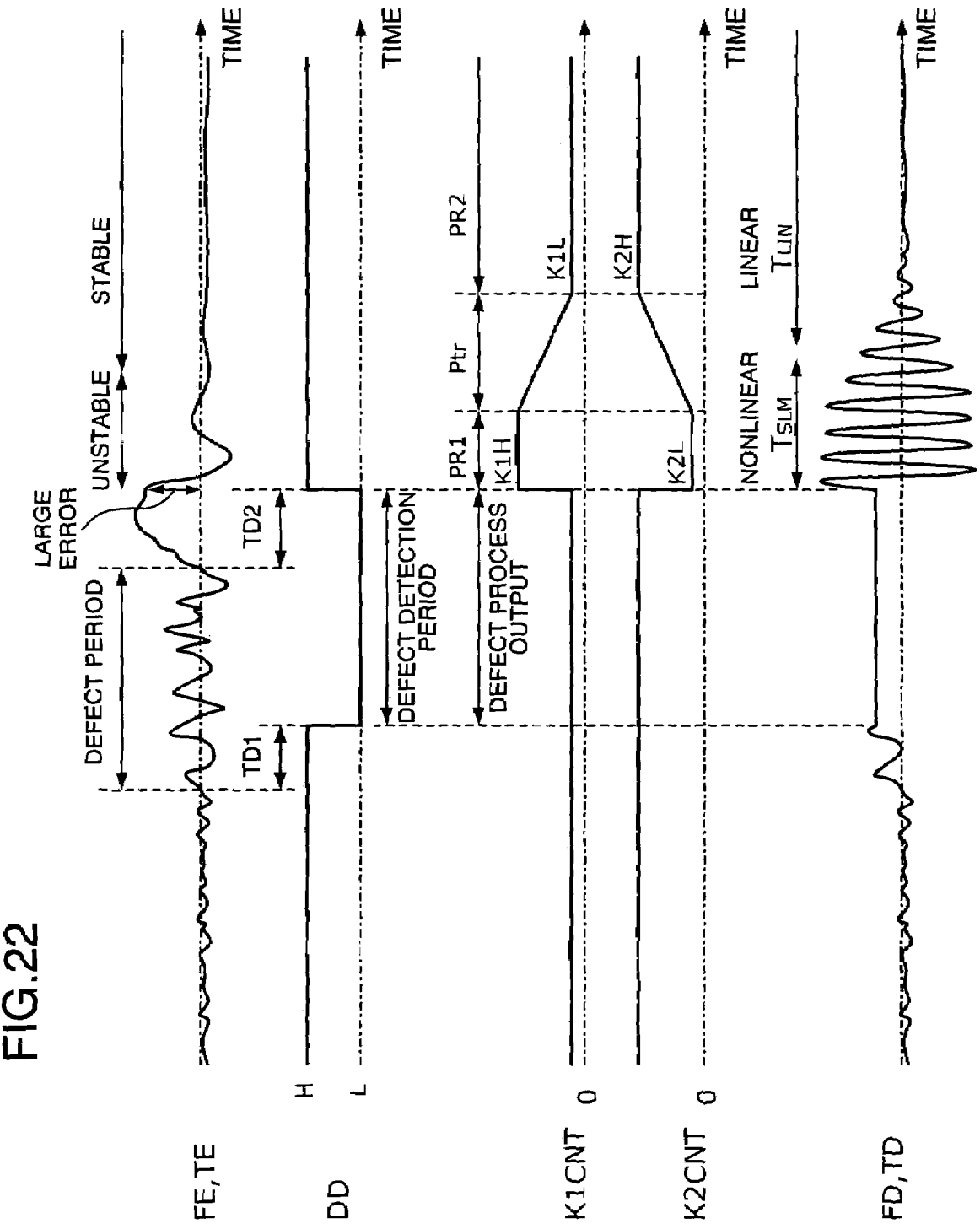
FIG. 22 is a timing chart for the operation of the servo controller according to the seventh embodiment of the present invention.

According to the embodiment, the state in which the nonlinear control is dominant ($T_{SLM}$) is switched to the state in which the linear control is dominant ($T_{LIN}$) during the transition period Ptr (refer to FIG. 22). The period $T_{SLM}$ during which the nonlinear control component is larger than the linear control component is set to the period during which a valid error signal continues from the point in time when the defect detection signal DD rises to H-level (recovery to the valid period). Briefly, the period $T_{SLM}$ is set to be shorter than the time after the disappearance of one defect to the occurrence of the following defect. The period $T_{SLM}$ can be obtained or estimated empirically in advance depending on the kind of the defect such as a finger print and so on. The period $T_{SLM}$ may be stored, for example, in a table or a memory (not shown) provided in the gain setting circuit 47 for use as appropriate. Alternatively, means for measuring the valid period may be provided to determine the period $T_{SLM}$ depending on the measurement.

The first period PR1, the transition period Ptr, and the respective gains K1 and K2 of the nonlinear control system and the linear control system may be determined as appropriate so that the pull-in operation is performed substantially by sliding-mode control after the recovery time from the defect period to the valid period before the appearance of the following defect and the state shifts to the state in which linear control is dominant. In other words, servo control may be performed such that the ratio of the nonlinear control component to the linear control component during the period $T_{SLM}$, in which the nonlinear control component is larger than the linear control component, is larger than a predetermined value. The nonlinear control component may be sufficiently larger (absolutely predominant) than the linear control component, for example, the ratio of the nonlinear control component to the linear control component may be 100, 10, or the like. Alternatively, the linear control component may be zero or negligible.

The length of the first period may be zero. In other words, the gains may be adjusted so that the linear control component is gradually increased immediately after the recovery to the valid period and the nonlinear control component is gradually decreased from the high gain so that the linear control component is lager than the nonlinear control component. Alternatively, the length of the transition period may be zero. Specifically, the respective gains of the linear control and the nonlinear control may be switched to the gains K2H and K1L of the second period, respectively, after the elapse of the first period.

Thus, according to the embodiment, servo pull-in operation can be performed in a short time by nonlinear control after termination of the defect, allowing stable servo control. Even when defect is generated repeatedly and the occurrence interval is short, stable and high-speed servo pull-in is ensured during the valid period between the occurrence of the defects. Also, the problem can be prevented that deviation is gradually accumulated to disturb servo control to make it difficult to perform stable servo control.

Accordingly, even when a defect occurs to disturb an error signal, high-speed and stable read/write position control can be performed. Also power consumption can be reduced as described above.

The embodiments have been described about the case in which the timings of decreasing and increasing the nonlinear control component and the linear control component are coincident with each other. The timings may not necessarily coincide. Also, the timing at which the linear control component becomes constant may not necessarily be coincident with the timing at which the nonlinear control component becomes constant. Specifically, it is sufficient to control the gains of the nonlinear control and the linear control so that the state in which the nonlinear control is predominant to the linear control is switched to the state in which the linear control is predominant to the nonlinear control after recovery to the valid period (termination or disappearance of the defect).

The embodiments have been described about the read/write controller of an optical recording medium; however, the invention may be applied to a magnetic pickup controller or another pickup controller using another method.

The invention has been described with reference to the preferred embodiments thereof. It should be understood by those skilled in the art that a variety of alterations and modifications may be made from the embodiments described above. It is therefore contemplated that the appended claims encompass all such alterations and modifications.

This application is based on Japanese Patent Applications No. 2003-373527 and No. 2003-137273 which are hereby incorporated by reference.

What is claimed is:

1. A read/write position controller of a pickup that reads from and/or writes to a recording medium while relatively moving a read/write position of the pickup and a read/write target position of the recording medium, comprising:
    an error signal generator for generating a position error signal indicating an error between the read/write position of the pickup and the read/write target position of the recording medium;
    an actuator for driving the pickup to change the read/write position of the pickup;
    a servo controller for performing nonlinear control and linear control of the read/write position of the pickup according to the position error signal to drive the actuator;
    a switching section for switching the servo controller from open mode to closed mode according to the position error signal; and
    an adjusting section for adjusting the gains of the nonlinear control and the linear control so that the nonlinear control component is larger than the linear control component at the time of switching of the servo controller from open mode to closed mode and the linear control component is larger than the nonlinear control component after the elapse of a predetermined time from the time of switching.

2. A controller according to claim 1, wherein the adjusting section adjusts the gains so that the nonlinear control component becomes sufficiently larger than the linear control component at the time of switching.

3. A controller according to claim 1, wherein the adjusting section adjusts the gains so that the linear control component is sufficiently larger than the nonlinear control component after the elapse of the predetermined time.

4. A controller according to claim 1, wherein the adjusting section adjusts the gains so that the linear control component gradually becomes larger than the nonlinear control component.

5. A controller according to claim 1, wherein the adjusting section adjusts the gains so that the nonlinear control component is sufficiently larger than the linear control component during a first period after the switching until the elapse of a first predetermined time and the linear control component is sufficiently larger than the nonlinear control component during a second period after the first period.

6. A controller according to claim 5, wherein there is provided a transition period between the first period and the second period, for increasing the linear control component relative to the nonlinear control component.

7. A controller according to claim 1, wherein the nonlinear control is sliding-mode control.

8. A controller according to claim 1, wherein the recording medium is an optical recording medium and the position error signal is a focus error signal and/or a tracking error signal.

9. A read/write position controller of a pickup that reads from and writes to an optical recording medium including a plurality of recording layers while relatively moving a read/write position of the pickup and a read/write target position of the optical recording medium, comprising:
- an error signal generator for generating a position error signal indicating an error between the read/write position of the pickup and the read/write target position of the optical recording medium;
- an actuator for driving the pickup to change the read/write position of the pickup;
- a servo controller for performing nonlinear control and linear control of the read/write position of the pickup according to the position error signal to drive the actuator;
- a receiving section for receiving a jump instruction signal instructing to jump the read/write position from one recording layer of the optical recording medium to another recording layer;
- a read/write position jump section for shifting the servo controller to open mode and moving the read/write position to the other recording layer according to the jump instruction signal;
- a switching section for switching the servo controller to closed mode for the other recording layer according to the position error signal; and
- an adjusting section for adjusting the gains of the nonlinear control and the linear control so that the nonlinear control component is larger than the linear control component at the time of switching of the servo controller to closed mode for the other recording layer and the linear control component is larger than the nonlinear control component after the elapse of a predetermined time from the time of switching.

10. A controller according to claim 9, wherein the adjusting section adjusts the gains so that the nonlinear control component is sufficiently larger than the linear control component at the time of switching to closed mode for the other recording layer.

11. A controller according to claim 9, wherein the adjusting section adjusts the gains so that the linear control component is sufficiently larger than the nonlinear control component after the elapse of the predetermined time.

12. A controller according to claim 9, wherein the adjusting section adjusts the gains so that the linear control component gradually becomes larger than the nonlinear control component.

13. A controller according to claim 9, wherein the nonlinear control is sliding-mode control.

14. A read/write position controller of a pickup that reads from and writes to a recording medium while relatively moving a read/write position of the pickup and a read/write target position of the recording medium, comprising:
- an error signal generator for generating a position error signal indicating an error between the read/write position of the pickup and the read/write target position of the recording medium;
- an actuator for driving the pickup to change the read/write position of the pickup;
- a servo controller for performing nonlinear control and linear control of the read/write position of the pickup according to the position error signal to drive the actuator;
- a receiving section for receiving a jump instruction signal instructing to jump the read/write position from one recording track of the recording medium to another recording track;
- a read/write position jump section for shifting the servo controller to open mode and moving the read/write position to the other recording track according to the jump instruction signal;
- a switching section for switching the servo controller to closed mode for the other recording track according to the position error signal; and
- an adjusting section for adjusting the gains of the nonlinear control and the linear control so that the nonlinear control component is larger than the linear control component at the time of switching of the servo controller to closed mode for the other recording track and the linear control component is larger than the nonlinear control component after the elapse of a predetermined time from the time of switching.

15. A controller according to claim 14, wherein the adjusting section adjusts the gains so that the nonlinear control component is sufficiently larger than the linear control component at the time of switching to closed mode for the other recording track.

16. A controller according to claim 14 or 15, wherein the adjusting section adjusts the gains so that the linear control component is sufficiently larger than the nonlinear control component after the elapse of the predetermined time.

17. A controller according to claim 14, wherein the adjusting section adjusts the gains so that the linear control component gradually becomes larger than the nonlinear control component.

* * * * *